(12) United States Patent
Choi et al.

(10) Patent No.: US 11,622,319 B2
(45) Date of Patent: Apr. 4, 2023

(54) ELECTRONIC DEVICE FOR PROVIDING AP LIST AND METHOD FOR OPERATING ELECTRONIC DEVICE

(71) Applicant: Samsung Electronics Co., Ltd., Gyeonggi-do (KR)

(72) Inventors: Jongmu Choi, Gyeonggi-do (KR); Sooji Kim, Gyeonggi-do (KR); Moonsoo Kim, Gyeonggi-do (KR); Bokun Choi, Gyeonggi-do (KR); Seongyu Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 17/165,038

(22) Filed: Feb. 2, 2021

(65) Prior Publication Data
US 2021/0160765 A1  May 27, 2021

Related U.S. Application Data

(63) Continuation of application No. 16/545,350, filed on Aug. 20, 2019, now Pat. No. 10,945,197.

(30) Foreign Application Priority Data

Aug. 29, 2018 (KR) .................. 10-2018-0102157
Aug. 12, 2019 (KR) .................. 10-2019-0098315

(51) Int. Cl.
*H04W 48/16* (2009.01)
*H04W 8/08* (2009.01)
(Continued)

(52) U.S. Cl.
CPC ............ *H04W 48/16* (2013.01); *H04W 4/24* (2013.01); *H04W 8/08* (2013.01); *H04W 88/06* (2013.01)

(58) Field of Classification Search
CPC ...... H04W 84/12; H04W 88/08; H04W 48/16; H04W 36/08; H04W 88/06; H04W 76/27;
(Continued)

(56) References Cited

U.S. PATENT DOCUMENTS

2002/0083429 A1* 6/2002 Rozenfeld ........... H04L 12/2876
717/174
2005/0048974 A1* 3/2005 Kim ................ H04W 36/00835
455/438
(Continued)

FOREIGN PATENT DOCUMENTS

CA    2630758 A1 * 11/2008 ........ H04M 1/72563
CN    105101354 A    11/2015
(Continued)

OTHER PUBLICATIONS

European Search Report dated Jun. 30, 2021.

*Primary Examiner* — Mahendra R Patel
(74) *Attorney, Agent, or Firm* — Cha & Reiter, LLC

(57) ABSTRACT

An electronic device and method are disclosed herein. The electronic device includes a communication module, a display, a memory and a processor which implements the method. The method includes receiving access point (AP) information from at least one AP through the communication module, generating an AP list including an AP communicatively connectable with the electronic device based on the received AP information, storing the AP list in the memory, identifying a state of the electronic device, determining an arrangement criterion for arranging a display order of Aps included in the AP list based on state information about the electronic device, and controlling the display to arrange the AP list according to the determined arrangement criterion.

20 Claims, 17 Drawing Sheets

(51) Int. Cl.
*H04W 4/24* (2018.01)
*H04W 88/06* (2009.01)

(58) Field of Classification Search
CPC ..... H04W 48/20; H04W 72/04; H04W 76/11; H04W 92/20; H04W 88/04; H04W 24/02; H04W 8/005; H04W 4/029; H04W 8/08; H04W 4/24; H04W 48/12; H04M 15/8044; H04M 15/8055; H04M 15/80; H04M 15/8038; H04M 15/83; H04M 15/85; H04M 15/851; H04M 17/026; H04M 17/023; H04M 17/02; H04M 15/28
USPC .......................................................... 455/434
See application file for complete search history.

(56) References Cited

U.S. PATENT DOCUMENTS

| | | | |
|---|---|---|---|
| 2008/0280621 A1 | 11/2008 | Soomro et al. | |
| 2011/0216692 A1* | 9/2011 | Lundsgaard | H04W 48/20 370/328 |
| 2012/0076118 A1* | 3/2012 | Montemurro | H04W 48/16 370/338 |
| 2013/0070601 A1 | 3/2013 | Shen | |
| 2013/0178212 A1* | 7/2013 | Maida | H04W 36/0061 455/436 |
| 2013/0223340 A1* | 8/2013 | Jeong | H04W 48/16 370/328 |
| 2013/0223424 A1* | 8/2013 | Jiang | H04W 48/20 370/338 |
| 2014/0092755 A1 | 4/2014 | Van et al. | |
| 2014/0092805 A1 | 4/2014 | van de ven | |
| 2014/0105195 A1* | 4/2014 | Balasubarmaniyan | H04W 48/20 370/338 |
| 2014/0235167 A1* | 8/2014 | Jung | H04W 76/15 455/41.2 |
| 2016/0135205 A1 | 5/2016 | Barbu et al. | |
| 2017/0289329 A1* | 10/2017 | Yim | H04M 1/72412 |
| 2018/0027545 A1 | 1/2018 | Kato | |

FOREIGN PATENT DOCUMENTS

| | | | | |
|---|---|---|---|---|
| CN | 107124744 A | | 9/2017 | |
| EP | 2770781 A1 | | 8/2014 | |
| JP | 2009-049922 A | | 3/2009 | |
| KR | 20070028117 A | * | 9/2005 | ........... H04W 48/20 |
| KR | 10-0701040 B1 | | 3/2007 | |
| KR | 10-2016-0039831 A | | 4/2016 | |
| KR | 10-1881255 B1 | | 7/2018 | |
| WO | WO-2014160805 A1 | * | 10/2014 | ........... H04L 12/145 |

\* cited by examiner

ELECTRONIC DEVICE FOR PROVIDING AP LIST AND METHOD FOR OPERATING ELECTRONIC DEVICE

CROSS-REFERENCE TO RELATED APPLICATION(S)

This application is a Continuation of U.S. application Ser. No. 16/545,350, filed on Aug. 20, 2019 which is based on and claims priority under 35 U.S.C. 119 to Korean Patent Application Nos. 10-2018-0102157, filed on Aug. 29, 2018, and 10-2019-0098315, filed on Aug. 12, 2019 in the Korean Intellectual Property Office, the disclosure of which is herein incorporated by reference in its entirety.

BACKGROUND

1) Field

Certain embodiments of the disclosure relate to an electronic device for providing an access point (AP) list and a method for operating the electronic device.

2) Description of Related Art

Various electronic devices, such as a smartphone, a tablet personal computer (PC), a portable multimedia player (PMP), a personal digital assistant (PDA), a laptop PC, and a wearable device, are now widely used.

Various electronic devices may support short-range wireless communication modes, such as wireless fidelity (WI-FI™), BLUETOOTH™, or ZIGBEE™.

Among short-range wireless communication technologies, WI-FI™ is a protocol supporting a wireless connection between an access point (AP) and an electronic device and can utilize various types of carrier frequencies to perform communication between the AP and the electronic device. For example, WI-FI™ includes a plurality of standards including IEEE 802.11a, IEEE 802.11g, and IEEE 802.11n.

Further, in performing wireless communication using WI-FI™ technology between an AP and an electronic device, wireless communication can be performed using a bandwidth corresponding to an allocated channel.

The user of an electronic device can select an AP for connection from among an AP list, including at least one AP connectable with the electronic device. The electronic device can establish a connection with the selected AP and perform data transmission and reception using a network service provided by the selected AP.

The above information is presented as background information only to assist with an understanding of the disclosure. No determination has been made, and no assertion is made, as to whether any of the above might be applicable as prior art with regard to the disclosure.

SUMMARY

An electronic device may provide an AP list including at least one selectable AP for a user to select an AP to connect with the electronic device. The AP list may include identifier information (service set identifier: SSID) about APs, information about the strength of a signal transmitted by an AP (received signal strength indicator: RSSI), and information indicating whether security is enabled on an AP.

The AP list may be provided for the user by listing the APs according to the signal strength of APs or in alphabetical order of AP identifiers.

Since the AP list is arranged according to the signal strength of APs or in alphabetical order of AP identifiers without considering state information about the electronic device, an AP other than an AP actually required for the user may be listed before the actually required AP.

An electronic device according to certain embodiments of the disclosure may include: at least one communication module, a display, a memory, and a processor operatively coupled to the communication module, the display, and the memory, the processor configured to: receive access point (AP) information from at least one AP through the communication module, generate an AP list including an AP communicatively connectable with the electronic device based on the received AP information, store the AP list in the memory, identify a state of the electronic device, determine an arrangement criterion for arranging a display order of APs included in the AP list based on state information about the electronic device, and control the display to display the AP list using an arrangement set according to the determined arrangement criterion. An electronic device according to certain embodiments of the disclosure may include at least one communication module, a display, a memory, and a processor operatively coupled to the communication module, the display, and the memory, the processor configured to: receive access point (AP) information about at least one AP communicatively connectable with the electronic device through the communication module, display an AP list based on the received AP information, detect a change in a state of the electronic device, determine an arrangement criterion for the AP list upon detecting the change in the state of the electronic device, and control the display to display the AP list using a display order set according to the determined arrangement criterion.

An operating method of an electronic device according to certain embodiments of the disclosure may include: receiving access point (AP) information about at least one AP communicatively connectable with the electronic device through a communication module, generating an AP list comprising the AP communicatively connectable with the electronic device based on the received AP information, and storing the generated AP list in a memory, identifying state information about the electronic device, determining an arrangement criterion for arranging a display order of APs included in the AP list based on the identified state information, changing the display order of APs in the AP list based on the determined arrangement criterion, and displaying the AP list on a display.

An electronic device and an operating method of an electronic device for providing an AP list according to certain embodiments may determine an arrangement criterion for an AP list on the basis of state information about the electronic device, thus providing an AP list arranged differently depending on the state information.

An electronic device for providing an AP list according to certain embodiments may provide an AP list suitable for the state of the electronic device on the basis of state information about the electronic device, thus efficiently providing information about an AP suitable for a situation encountered by a user.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
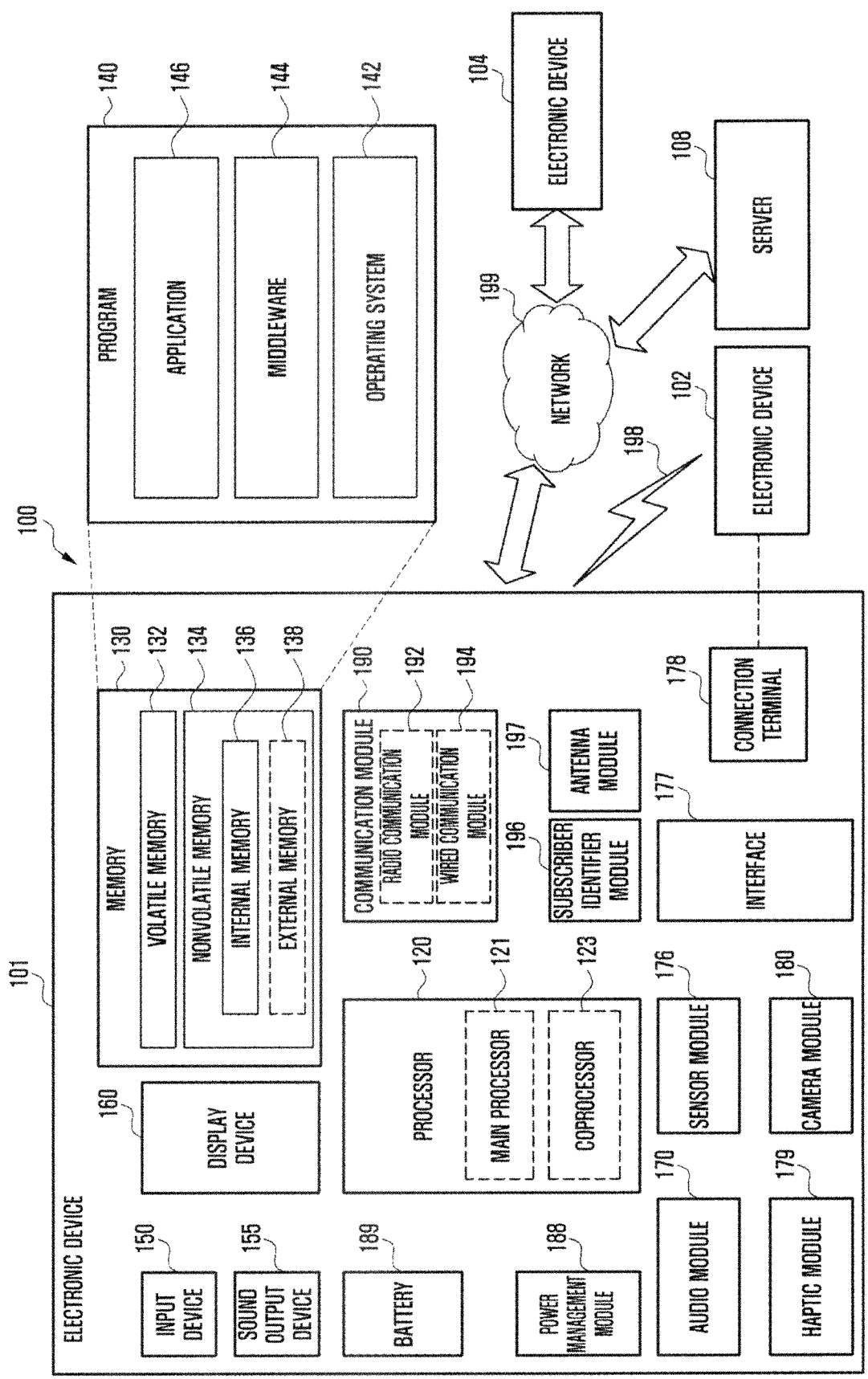
FIG. 1 is a block diagram illustrating an electronic device according to certain embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH™, wireless-fidelity (WI-FI™) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
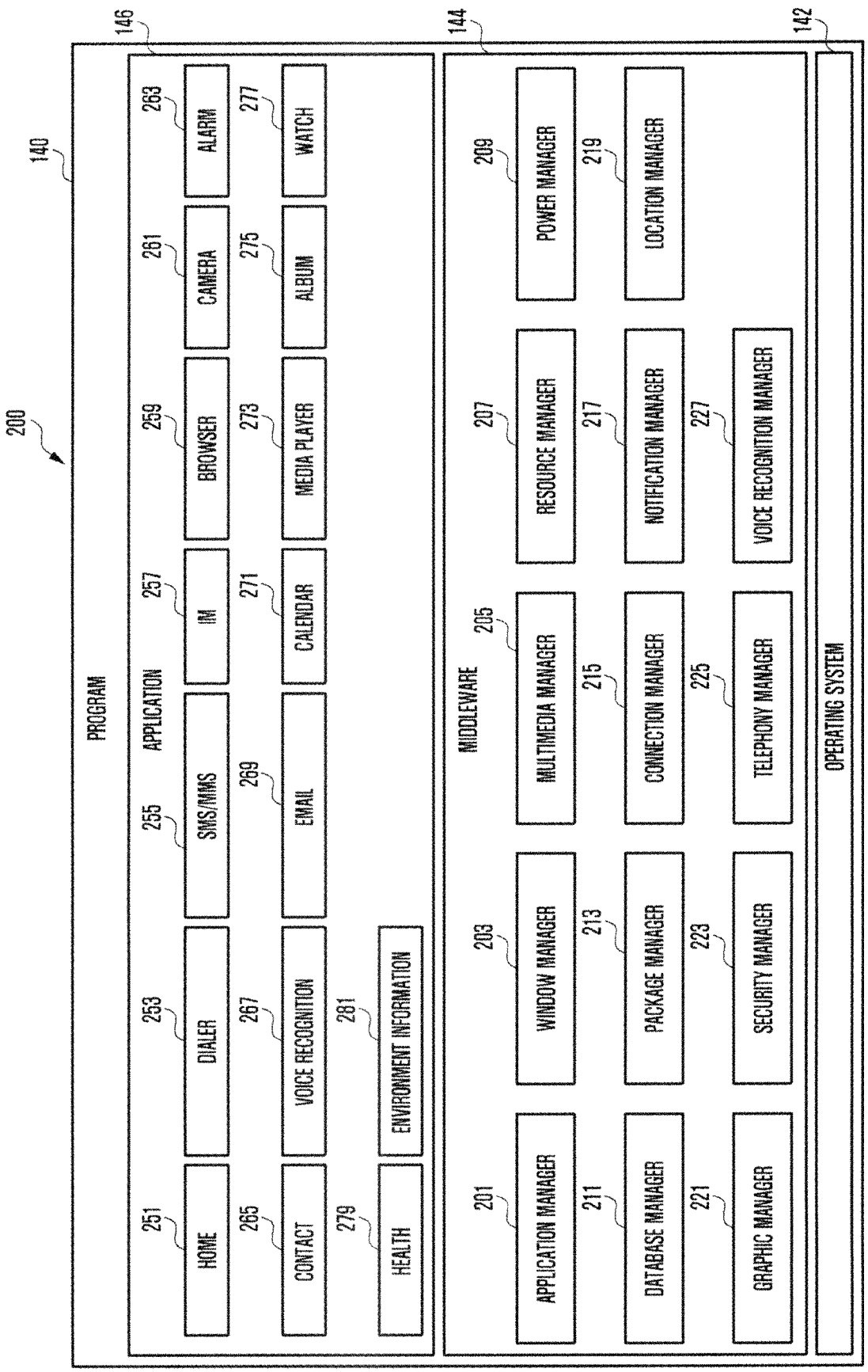
FIG. 2 is a block diagram illustrating a program according to certain embodiments of the disclosure.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home application 251, dialer application 253, short message service (SMS)/multimedia messaging service (MMS) 255, instant message (IM) application 257, browser application 259, camera application 261, alarm application 263, contact application 265, voice recognition application 267, email application 269, calendar application 271, media player application 273, album application 275, watch application 277, health application 279 (e.g., for measuring the degree of workout or biometric information, such as blood sugar), or environmental information application 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
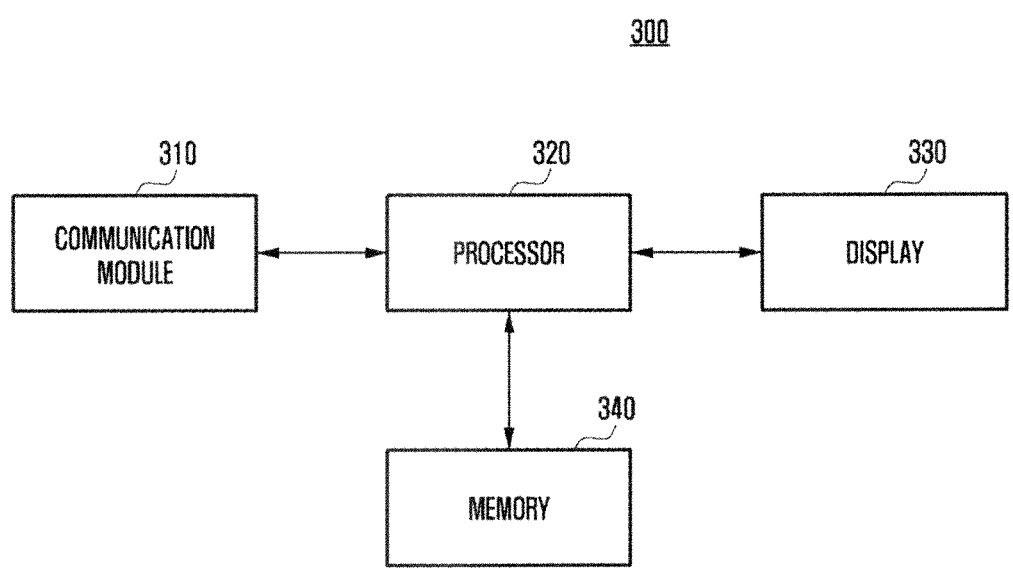
FIG. 3 is a block diagram illustrating an electronic device according to certain embodiments of the disclosure.

FIG. 3 is a block diagram illustrating an electronic device according to certain embodiments of the disclosure.

Referring to FIG. 3, the electronic device 300 (e.g., the electronic device 101 of FIG. 1) according to certain embodiments of the disclosure may include a communication module 310, a processor 320, a display 330, and a memory 340.

According to certain embodiments of the disclosure, the communication module 310 may transmit and receive data to and from an external electronic device (not shown). The communication module 310 may use a network provided by an access point (AP) in order to transmit and receive data to and from an external electronic device (not shown). The AP may provide a short-range communication network (local area network: LAN). For example, the AP may provide the electronic device 300 with various short-range communication networks, such as a WI-FI™ network and a ZIGBEE™ network.

According to certain embodiments of the disclosure, the communication module 310 may receive AP information from the AP in order to connect with the AP. The AP may broadcast a beacon frame every preset period using a communication channel used by the AP. The beacon frame may include the AP information. The AP information may include various pieces of information about the AP including at least some of a service set identifier (SSID), a basic SSID (BSSID), a media access control (MAC) address, a frequency band, and channel bandwidth information of the AP, location information about the AP, and quality of service (QoS) control information. The communication module 310 may receive the beacon frame broadcast by the AP. The AP information received by the communication module 310 may be used for connection with the AP. According to certain embodiments of the disclosure, the communication module 310 may transmit a signal for requesting AP information to a particular AP or may broadcast the signal to an unspecified AP under the control of the processor 320. At least one AP located around the electronic device 300 may transmit a beacon frame including AP information to the electronic device 300 upon receiving the signal for requesting the AP information.

According to certain embodiments of the disclosure, the communication module 310 may receive the AP information from an external server (e.g., the server 108 of FIG. 1). The external server 108 may manage at least one piece of AP information. The external server 108 may collect the AP information from a plurality of electronic devices having accessed the AP. The external server 108 may generate and manage AP information using the collected information. The external server 108 may transmit additional information stored and processed by the external server 108 to the electronic device 300 in response to a request for AP information from the electronic device 300.

According to certain embodiments of the disclosure, the electronic device 300 may receive the AP information and the additional information transmitted by the external server 108. The additional information stored and processed by the external server 108 may include at least one piece of information among network quality information about the AP, location information about the AP, or information indicating whether to set encryption of the AP.

According to certain embodiments of the disclosure, the electronic device 300 may also receive information utilized for connection to the AP (e.g., a password or ID) from the external server 108.

According to certain embodiments of the disclosure, the additional information received by the electronic device 300 from the external server 108 may include information about a location at which the AP is installed, information about a store in which the AP is installed, the average upload or download speed of the network provided by the AP, payment information about the network provided by the AP, quality information about the network provided by the AP, the presence of an authentication procedure for using the network provided by the AP, or network congestion information. The additional information received by the electronic device 300 from the external server 108 may include the time for which a connection between each of a plurality of electronic devices and the AP is maintained or various pieces of information (e.g., the congestion of a place where the AP is located or the popularity of a place where the AP is located) obtained from the time for which the connection is maintained.

According to certain embodiments of the disclosure, the communication module 310 may receive AP information from an external electronic device. The external electronic device may be an external electronic device used by the same user of the electronic device 300 (or used with the same account). The communication module 310 may transmit a request for AP information stored by the external electronic device to the external electronic device used by the same user and may receive the AP information transmitted by the external electronic device. According to an embodiment, the AP information stored by the external electronic device may be shared with the electronic device 300 through the external server 108 (e.g., a cloud server or an account management server). The processor 320 may generate or change an AP list on the basis of the AP information transmitted from the external server 108 or the external electronic device.

According to certain embodiments of the disclosure, the AP information received by the communication module 310 may be stored in the memory 340 (e.g., the memory 130 of FIG. 1). The AP information stored in the memory 340 may include at least some of an SSID, a BSSID, and an MAC address of each AP, frequency information of the AP, frequency band information of the AP, information about a channel that the AP can provide, a password for access to the AP, information about whether the AP is encrypted, or the additional information received from the external server 108. APs included in the AP information may refer to an AP having a history of connection to the electronic device 300 or having a history of retrieval by the electronic device 300. The AP information stored in the memory 340 may be stored in various forms including a list type under the control of the processor 320 and may be updated under the control of the processor 320.

According to certain embodiments of the disclosure, the processor 320 may generate an AP list, which is a list of APs to which the electronic device 300 can connect, using the AP information stored in the memory 340. The processor 320 may control the display 330 to display the generated AP list. When receiving a user input to select one AP from among one or more APs included in the AP, the processor 320 may control the communication module 310 to connect to the selected AP.

According to certain embodiments of the disclosure, the processor 320 may identify the state of the electronic device 300 and may determine a criterion for arranging the AP list on the basis of state information about the electronic device 300.

According to certain embodiments of the disclosure, the state information about the electronic device 300 may include information indicating whether an AP to which the electronic device 300 can connect is located near the electronic device 300.

According to certain embodiments of the disclosure, the processor 320 may store information about APs having a history of connection in the memory 340. The information about the APs may include at least some of the SSID of an AP, security type information about an AP (e.g. various security types including an open type indicating that an AP is available without authentication, a phase shift keying type, and a wired equivalent privacy (WEP) type), a password required to use an AP, information about a channel provided by an AP (e.g., the bandwidth of a channel), or information about a carrier network provided by a mobile network operator.

The processor 320 may receive AP information transmitted by at least one AP located nearby and may identify whether there is an AP having a history of connection using the AP information and information about an AP having a history of connection stored in the memory 340. The processor 320 may determine that there is a connectable AP on the basis of whether there is an AP having a history of connection. When there is an AP having a history of connection, the processor 320 may control the communication module 310 to connect to the AP having the history of connection using the information about the APs stored in the memory 340.

According to certain embodiments of the disclosure, the state information about the electronic device 300 may include location information about the electronic device 300. The processor 320 may compare the identified location information about the electronic device 300 with location information about the location of the APs included in the AP information stored in the memory 340. The processor 320 may identify APs located within a preset distance from the current location of the electronic device 300. When determining that there is an AP within the preset distance from the current location of the electronic device 300, the processor 320 may determine that there is a connectable AP. When determining that there is no AP within the preset distance from the current location of the electronic device 300, the processor 320 may determine that the electronic device 300 is in a new place where the electronic device 300 has never connected to a local area network.

According to certain embodiments of the disclosure, the processor 320 may identify the location of the electronic device 300 using a position sensor (e.g., the sensor module 176 of FIG. 1) included in the electronic device 300. The position sensor may include a global positioning system (GPS) sensor or a global navigation satellite system (GNSS) sensor. The processor 320 may also identify the current location of the electronic device 300 using geofencing of zoning a location measured by the position sensor 176. Geofencing may refer to a technique for identifying the current location of the electronic device 300 on the basis of the entry of the electronic device 300 to an area enclosed by a virtual fence. When determining that the electronic device 300 is not located in any area enclosed by a virtual fence stored in the electronic device 300, the processor 320 may determine that the electronic device 300 is in a new place where the electronic device 300 has never connected to a local area network.

According to certain embodiments of the disclosure, the processor 320 may also identify the location of the electronic device 300 using various communication methods (e.g., BLUETOOTH™, WI-FI™, LI-FI™, NFC, or RFID™) supportable by the communication module 310 other than the position sensor 176. The processor 320 may identify the location measured using the communication module 310 and may determine that the electronic device 300 is in a new place where the electronic device 300 has never connected to a local area network.

According to certain embodiments of the disclosure, the state information about the electronic device 300 may include roaming information about the electronic device 300. Roaming of the electronic device 300 may indicate a state in which a network operator to which the electronic device 300 subscribes does not correspond to a network operator currently available to the electronic device 300. The electronic device 300 may enter a state in which it is possible to use a network service provided by a different network operator in a state in which a network operator set in a subscriber identification module (e.g., the subscriber identification module 196 of FIG. 1) of the electronic device 300 cannot provide a network service. A roaming state may indicate a state in which the electronic device 300 can use a network service provided by a network operator other than the network operator to which the electronic device 300 subscribes.

According to certain embodiments of the disclosure, the processor 320 may identify identifier information about a network to which the electronic device 300 subscribes using a mobile country code (MCC) and a mobile network code (MNC) set in the subscriber identification module (e.g., the subscriber identification module 196 of FIG. 1) of the electronic device 300. The processor 320 may compare identifier information about a cellular network currently used with the identifier information about the network to which the electronic device 300 subscribes. The processor 320 may determine whether the electronic device 300 is in the roaming state on the result of comparing the identifier information.

According to certain embodiments of the disclosure, the state information about the electronic device 300 may include a tariff plan of the cellular network to which the electronic device 300 subscribes. A cellular network operator may provide cellular networks having different characteristics including the total amount of data that the electronic device 300 can use via the cellular network, the remaining amount of data that the electronic device 300 can use via the cellular network, or the maximum speed limit of the cellular network depending on a fee paid by the user of the electronic device 300. The electronic device 300 may receive the tariff plan of the cellular network from a server operated by the cellular network operator. The processor 320 may identify the state information including the remaining amount of data that the electronic device 300 can transmit and receive on the basis of the tariff plan.

According to certain embodiments of the disclosure, the state information about the electronic device 300 may include location information about the electronic device 300, a tariff plan of the cellular network used by the electronic device 300, or state information about the cellular network used by the electronic device 300 (e.g., information about whether the electronic device 300 is put on roaming). However, the aforementioned examples are provided for illustrative purposes, and the state information about the electronic device 300 may include various pieces of information.

According to certain embodiments of the disclosure, the processor 320 may determine a criterion for arranging the AP list on the basis of the state information about the electronic device 300. The criterion for arranging the AP list may include various criteria including a criterion for listing AP names in alphabetical order, a criterion for listing APs in signal strength (RSSI) order, a criterion for first listing APs available to all users without entering a password, a criterion for first listing captive portal networks available after authentication, or a criterion for first listing APs available for free. The processor 320 may select at least one arrangement criterion from among criteria for arranging the AP list stored in the electronic device 300 on the basis of the state information about the electronic device 300. The processor 320 may control the display 330 to display the AP list according to the selected arrangement criterion. The processor 320 may change the AP list using the selected arrangement criterion. The processor 320 may arrange at least one AP included in the AP list in order according to the selected arrangement criterion.

According to certain embodiments of the disclosure, the processor 320 may identify whether there is an AP corresponding to the AP information stored in the memory 340 among the APs included in the AP list. The AP list may include an AP having a history of connection with the electronic device 300. The AP information stored in the memory 340 may include information about an AP having a history of connection with the electronic device 300. When the electronic device 300 is connected to an AP, the electronic device 300 may add information about the connected AP to the AP information. The processor 320 may identify whether a scanned AP is included in the AP information, and may determine the scanned AP as an AP having a history of connection when the scanned AP is included in the AP information.

According to certain embodiments of the disclosure, when identifying that the scanned AP is included in the AP information stored in the memory 340, the processor 320 may select an arrangement criterion for listing the identified AP first. The processor 320 may change the AP list such that the identified AP is listed first. Information about the identified AP is included in the AP information stored in the memory 340, and the processor 320 may establish a connection to the identified AP using the AP information. When identifying that there is no AP corresponding to the AP information stored in the memory 340, the processor 320 may select an arrangement criterion for first listing an open network, which is a network connectable without entering a password or performing an authentication process. The processor 320 may change the AP list such that the open network is listed first.

According to certain embodiments of the disclosure, changing the AP list may mean changing positions where one or more APs included in the AP list are displayed. For example, the processor 320 may display the AP list via the display 330, and may change the AP list such that an AP displayed at the bottom of the AP list is displayed at the top of the AP list.

According to certain embodiments of the disclosure, the processor 320 may prioritize various criteria on the basis of the state information about the electronic device 300 and may change the AP list on the basis of original priorities. For example, the processor 320 may assign a higher priority to an arrangement criterion for displaying an AP providing an open network first than other arrangement criteria (e.g., an arrangement criterion for displaying an AP having a higher RSSI first) on the basis of state information indicating that the electronic device 300 is in the roaming state. The processor 320 may change the AP list using an arrangement criterion having a higher priority.

According to certain embodiments of the disclosure, the processor 320 may control the display 330 to display the AP list according to the selected arrangement criterion. According to certain embodiments of the disclosure, the electronic device 300 may select at least one arrangement criterion from among a plurality of arrangement criteria on the basis of the state information about the electronic device 300 and may change the AP list according to the selected arrangement criterion. The disclosure enables the user to select an AP suitable for various states of the electronic device 300 through the AP list changed according to the selected arrangement criterion. Certain embodiments of the AP list will be illustrated below in the following drawings.

According to certain embodiments of the disclosure, the processor 320 may detect a change in the state of the electronic device 300. When detecting a change in the state of the electronic device 300, the processor 320 may re-determine a criterion for arranging the AP list and may change the AP list on the basis of the re-determined arrangement criterion. For example, the processor 320 may detect that the remaining amount of data that the electronic device 300 can use via the cellular network has changed to be below a preset value. The processor 320 may change a criterion for arranging the AP list and may change the AP list on the basis of the changed arrangement criterion. In another example, the processor 320 may identify the state of a first network that the electronic device 300 is using. When identifying that the state of the first network does not satisfy a preset condition, the processor 320 may re-determine a criterion for arranging the AP list and may change the AP list on the basis of the re-determined arrangement criterion. In still another example, the processor 320 may monitor the location of the electronic device 300 measured by the position sensor 176 or the communication module 310 of the electronic device 300 and may identify that the location of the electronic device 300 has changed. When identifying that the location of the electronic device 300 has changed, the processor 320 may re-determine a criterion for arranging the AP list and may change the AP list on the basis of the re-determined arrangement criterion.

According to certain embodiments of the disclosure, the processor 320 may change the AP list on the basis of the QoS control information included in the AP information. QoS data may include QoS control information in order to provide QoS for wireless LAN data communication performed between an AP and the electronic device 300, and the QoS data may be included in data transmitted by the AP.

According to certain embodiments of the disclosure, the AP may specify an access category (AC) that the AP can provide in a QoS control field and may transmit the QoS control field to the electronic device 300. The AP may manage packets put in different queues according to the AC and may preferentially process communication for a queue having a higher priority.

According to certain embodiments of the disclosure, when a plurality of electronic devices transmits and receives data through one AP, a service of a packet transmitted and received by one electronic device 300 of the plurality of electronic devices to and from the AP may be a voice call service. The voice call service needs to be provided continuously with high quality. To this end, the electronic device 300 may assign a high service rating to the voice call service and may include information on the assigned service rating in the QoS data. The electronic device 300 may transmit the QoS data to the AP. The AP may preferentially process a packet having a high service rating according to the QoS control information included in the QoS data, thereby providing a seamless call service.

According to certain embodiments of the disclosure, when a plurality of electronic devices using a service having a high service rating communicates with the same AP, communication of an electronic device using a service having a low service rating may not be properly performed. The AP may store and analyze the received QoS data, thus storing overload information due to a packet associated with a service having a high service rating.

According to certain embodiments of the disclosure, while the electronic device 300 is using a service having a low service rating through a WI-FI™ network, the communication speed may be lower than a certain level. The electronic device 300 may request, from the AP, QoS control information including information about the amount of packets of a service having a high service rating, which is included in QoS control data about packets transmitted and received by the AP for a preset period, and may change the AP list on the basis of the QoS control information of the AP among the received information.

Figure 4A:
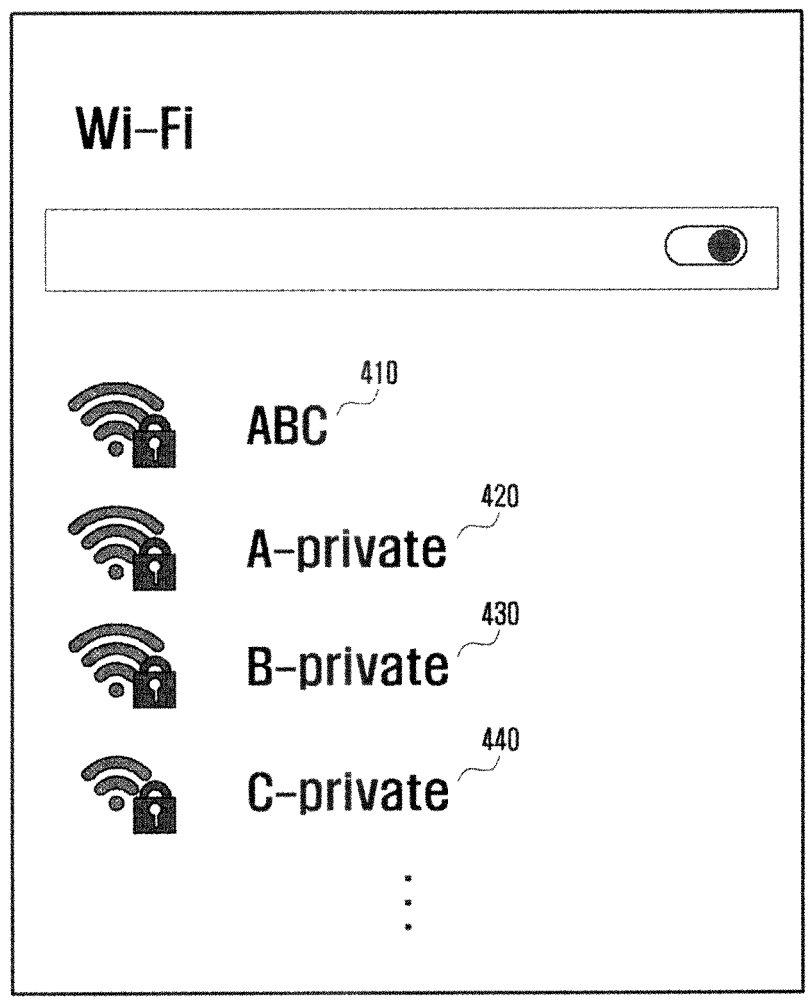
FIG. 4A illustrates an example of an AP list in an electronic device according to certain embodiments of the disclosure.
Figure 4B:
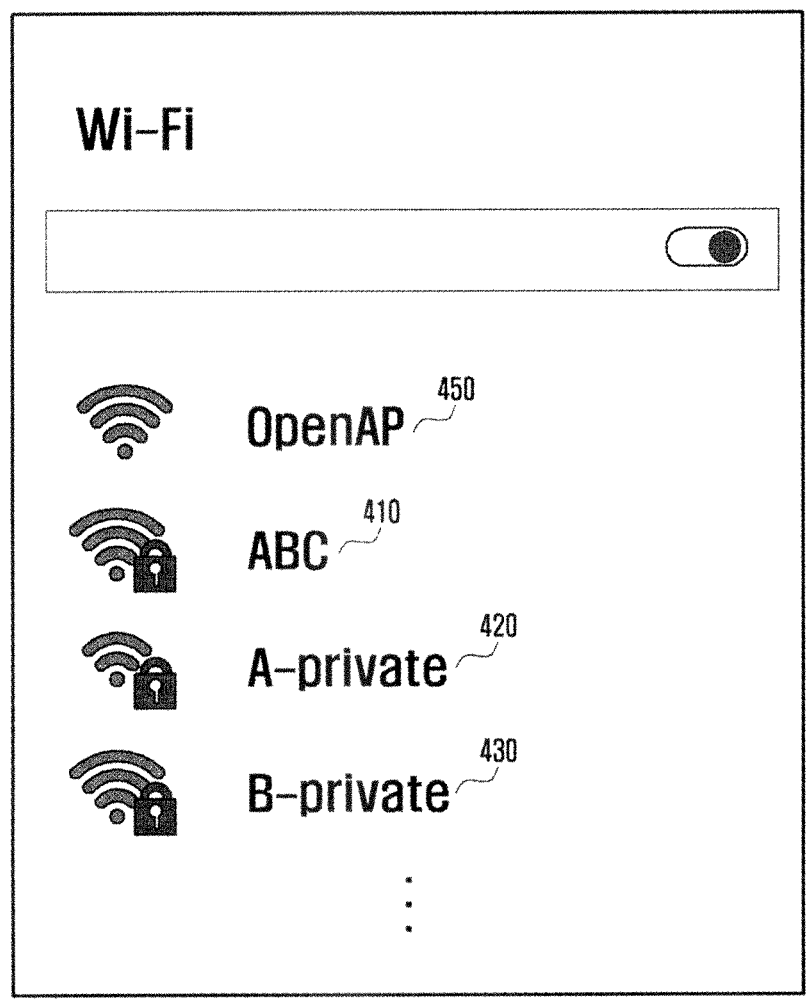
FIG. 4B illustrates an example of an AP list in an electronic device according to certain embodiments of the disclosure.

FIG. 4A illustrates an example of an AP list in an electronic device according to certain embodiments of the disclosure. FIG. 4B illustrates an example of an AP list in an electronic device according to certain embodiments of the disclosure.

FIG. 4A and FIG. 4B show AP lists displayed on a display (e.g., the display 330 of FIG. 3) of an electronic device (e.g., the electronic device 300 of FIG. 3) according to certain embodiments of the disclosure. For example, it is assumed that there are five APs (ABC 410, A_private 420, B_private 430, C_private 440, and OpenAP 450) in communicative proximity to the electronic device 300. It is assumed that, among the five APs, one AP (Open AP 450) is available without requiring password input or user authentication, and four Aps (ABC 410, A_private 420, B_private 430, and C_private 440) require password input or user authentication.

Referring to FIG. 4A, the display 330 may display four APs (ABC 410, A_private 420, B_private 430, and C_private 430) of the five Aps, due to the limited size of the display area for displaying an AP list. (440)). FIG. 4A illustrates an example in which an AP list is displayed according to a criteria for arranging AP names in alphabetical order.

According to certain embodiments of the disclosure, a processor (e.g., the processor 320 of FIG. 3) may identify state information about the electronic device 300. For example, the processor 320 may identify that the electronic device 300 is in a roaming state. When the electronic device 300 is in the roaming state, it may be desirable to use a short-range communication network. Referring to FIG. 4A, all the APs displayed on the display 330 may require password input or user authentication. The AP 450 which does not require password input or user authentication may not be displayed due to the limited size of the display 330 or may be displayed at the bottom of the displayed AP list. Thus, the user of the electronic device 300 may encounter difficulty in selecting the AP 450, which is an open network available without requiring user authentication.

According to certain embodiments of the disclosure, the processor 320 may identify the state information about the electronic device 300. For example, the processor 320 may identify that the electronic device 300 is in the roaming state. The processor 320 may determine a criterion for arranging the AP list on the basis of the state information about the electronic device 300. For example, the processor 320 may determine an arrangement criterion for first displaying an AP available without requiring password input or user authentication and may change the AP list on the basis of the arrangement criterion.

Referring to FIG. 4B, an AP (Open AP 450) available without requiring password input or user authentication may be displayed on the top of the AP list before the APs (ABC 410, A_private 420, B_private 430, and C_private 440) requiring password input or user authentication. The user may select the AP (Open AP 450) available without requiring password input or user authentication, and the processor 320 may control the communication module 310 to establish a connection with the selected AP (Open AP 450).

The electronic device 300 according to certain embodiments of the disclosure may select a different arrangement criterion according to the state information about the electronic device 300 and may change an AP list on the basis of the selected arrangement criterion, thereby efficiently selecting and connecting a network suitable for a situation or enabling the user to select the network.

Figure 5:
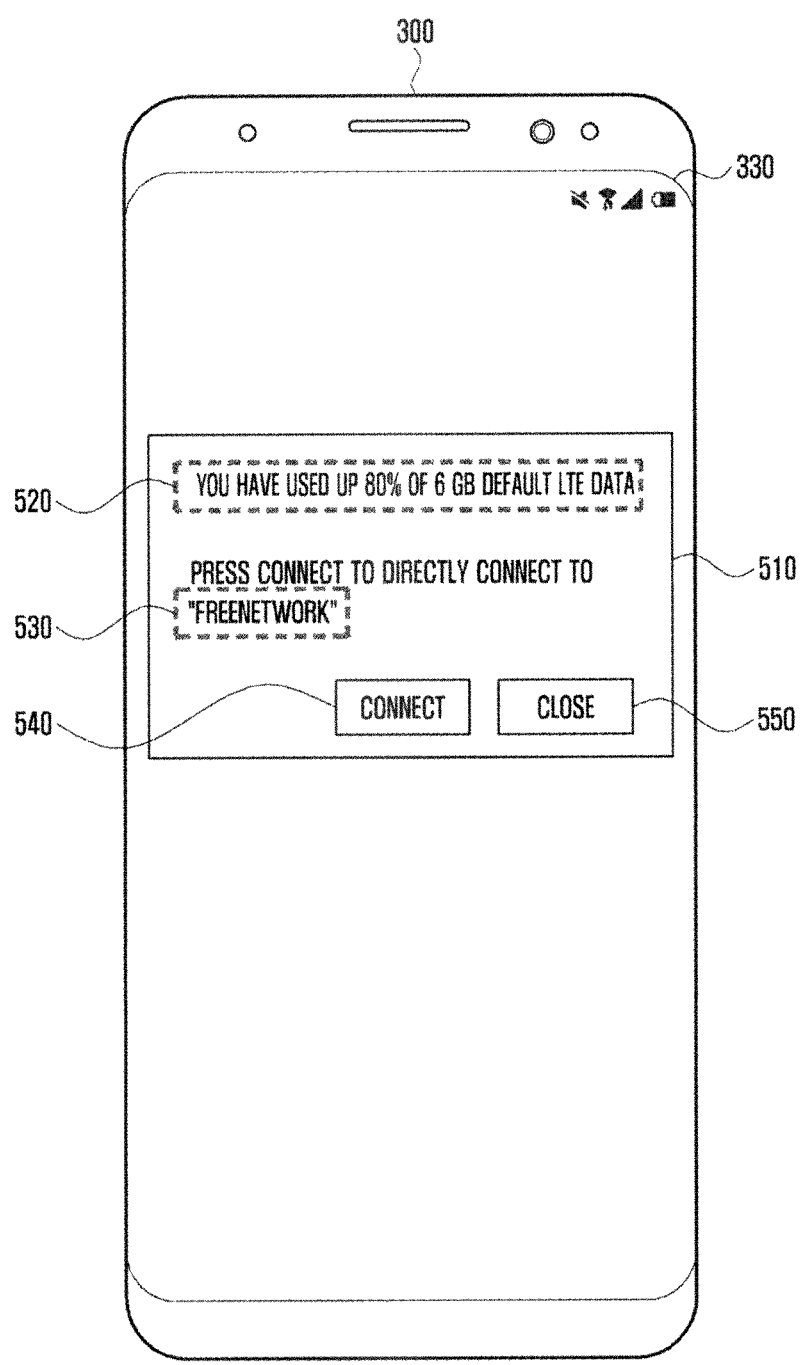
FIG. 5 illustrates an example of an AP list for proposing a connection to a network other than a currently connected network in an electronic device according to certain embodiments of the disclosure.

FIG. 5 illustrates an example of an AP list for proposing a connection to a network other than a currently connected network in an electronic device according to certain embodiments of the disclosure.

According to certain embodiments of the disclosure, an electronic device (e.g., the electronic device 300 of FIG. 3) may change an AP list on the basis of state information about the electronic device 300 and may output a message for proposing a connection to one AP among APs included in the changed AP list. A processor (e.g., the processor 320 of FIG. 3) may output, through the display 330 of the electronic device 300, a message 510 about whether to connect to an AP to which the electronic device 300 can connect among the APs included in the AP list on the basis of the state information about the electronic device 300. According to certain embodiments of the disclosure, the message 510 may include at least one of identification information 530 about a recommended AP among connectable APs or the state information 520 about the electronic device 300. For example, the state information 520 may include various pieces of information including information indicating the roaming state of the electronic device 300 or information indicating that it is impossible to connect to a cellular network.

Referring to FIG. 5, the message 510 may include a tariff plan (e.g., information indicating that the remaining amount of data available via the cellular network is insufficient), which is the state information 520 about the electronic device 300, and identification information 530 (e.g., SSID or MAC address) of the recommended AP. The electronic device 300 may receive user input to connect the recommended AP. When receiving the user input, the processor 320 may control a communication module (e.g., the communication module 310 of FIG. 3) to perform a series of operations to connect the recommended AP.

According to certain embodiments of the disclosure, the processor 320 may output a message for proposing a connectable AP in various forms on the basis of the state information about the electronic device 300. As illustrated in FIG. 5, the message may be output as a pop-up message. Alternatively, the message for proposing the connectable AP may be output through a speaker (not shown) of the electronic device 300. In response to user input to select a connectable AP through a microphone (not shown), the electronic device 300 may perform a series of operations to connect with the selected AP.

According to certain embodiments of the disclosure, the processor 320 may control the communication module 310 to connect to a proposed AP in response to user input to connect to a connectable AP (e.g., user input to select a Connect 540 button).

According to certain embodiments of the disclosure, the processor 320 may control the communication module 310 to maintain a currently connected network, instead of connecting a proposed AP, in response to user input not to connect to a connectable AP (e.g., user input to select a Cancel 550 button).

According to certain embodiments of the disclosure, the processor 320 may control the communication module 310 to automatically connect to a recommended AP according to user settings to automatically connect to a recommended AP.

Figure 6A:
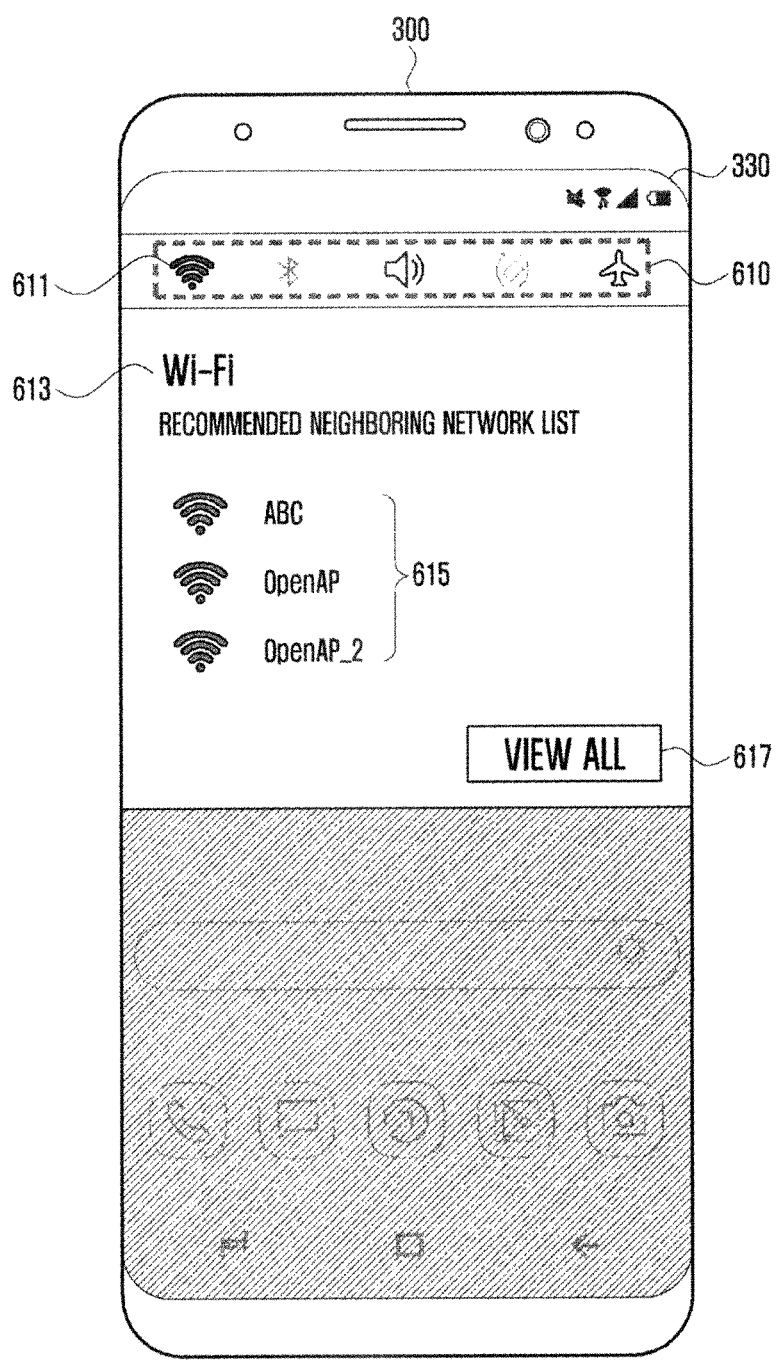
FIG. 6A illustrates various modes of displaying an AP list in an electronic device according to certain embodiments of the disclosure.
Figure 6B:
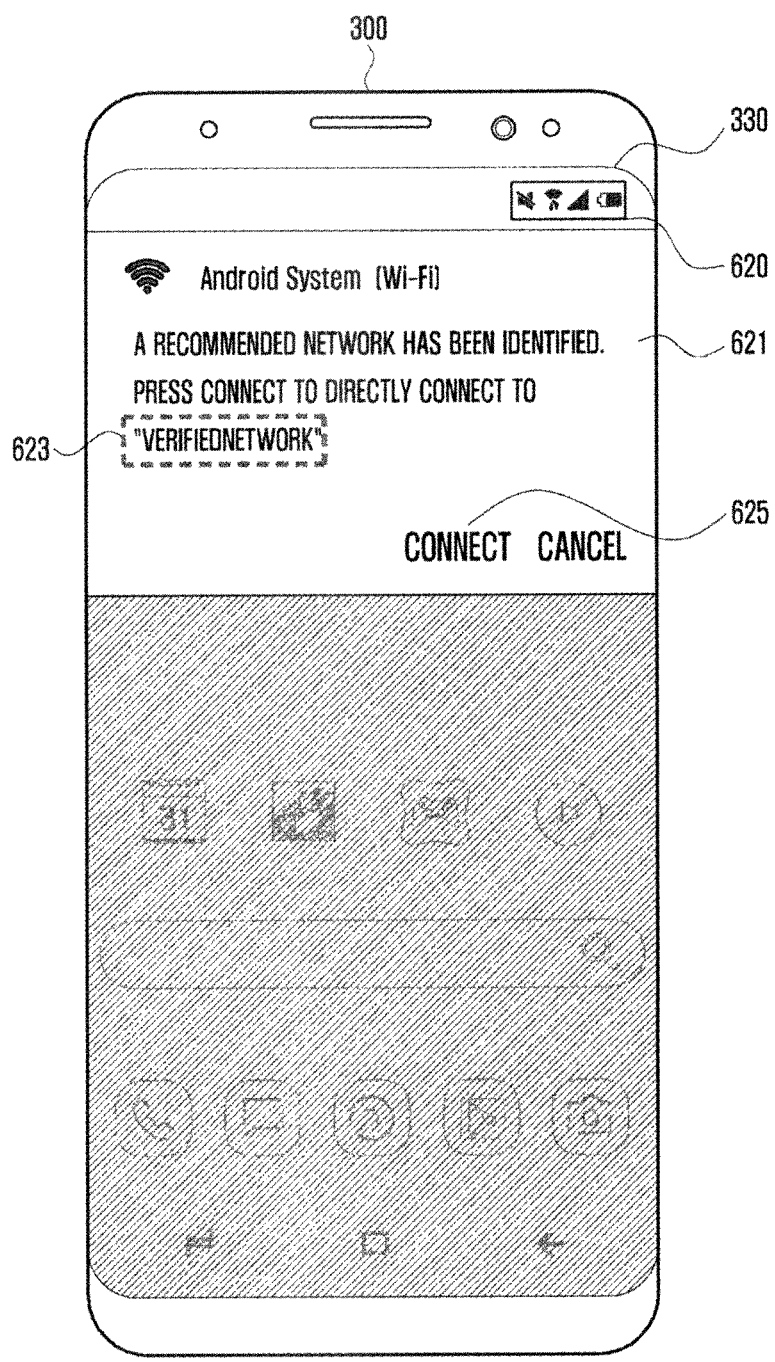
FIG. 6B illustrates various modes of displaying an AP list in an electronic device according to certain embodiments of the disclosure.
Figure 6C:
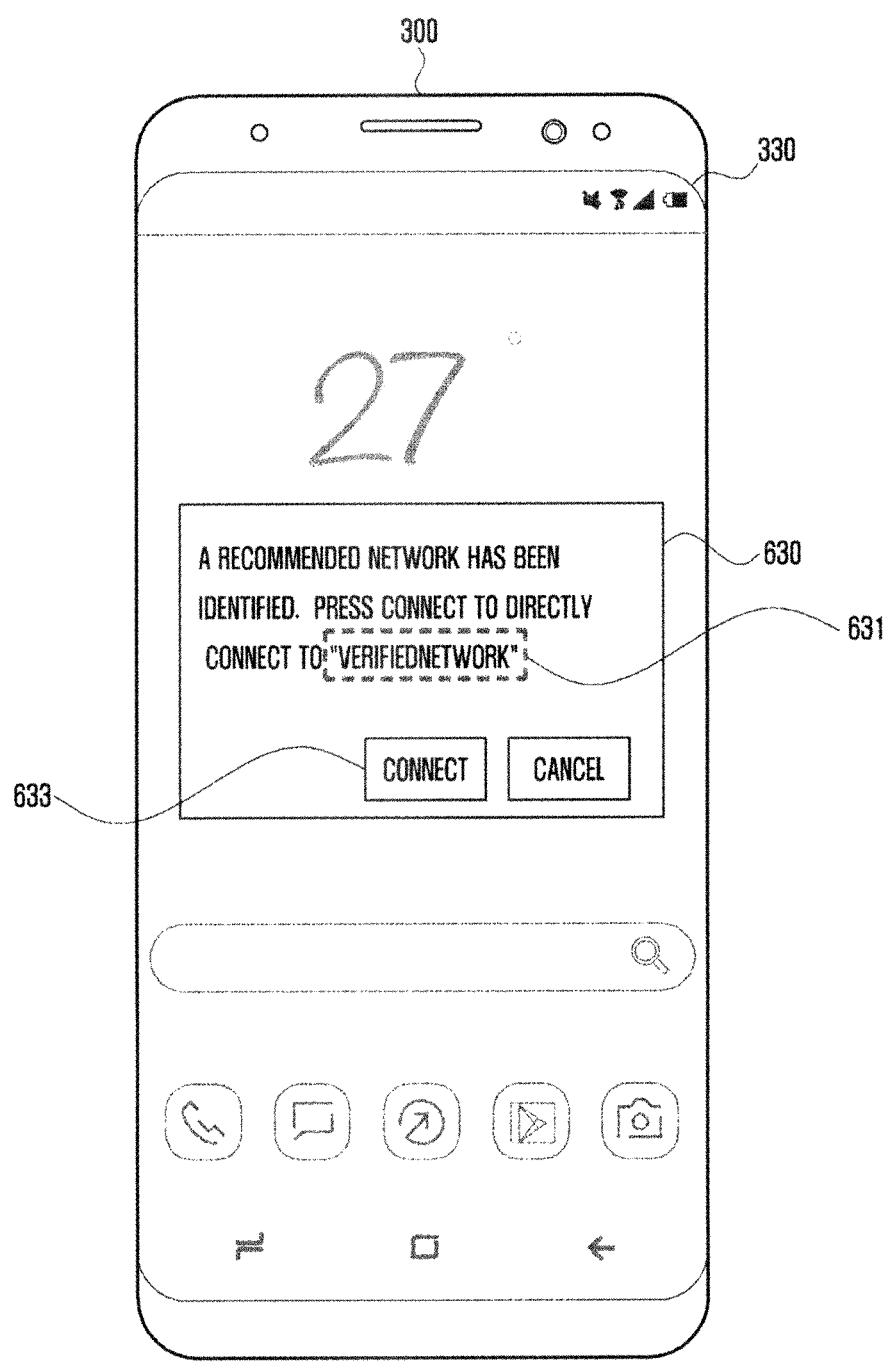
FIG. 6C illustrates various modes of displaying an AP list in an electronic device according to certain embodiments of the disclosure.
Figure 6D:
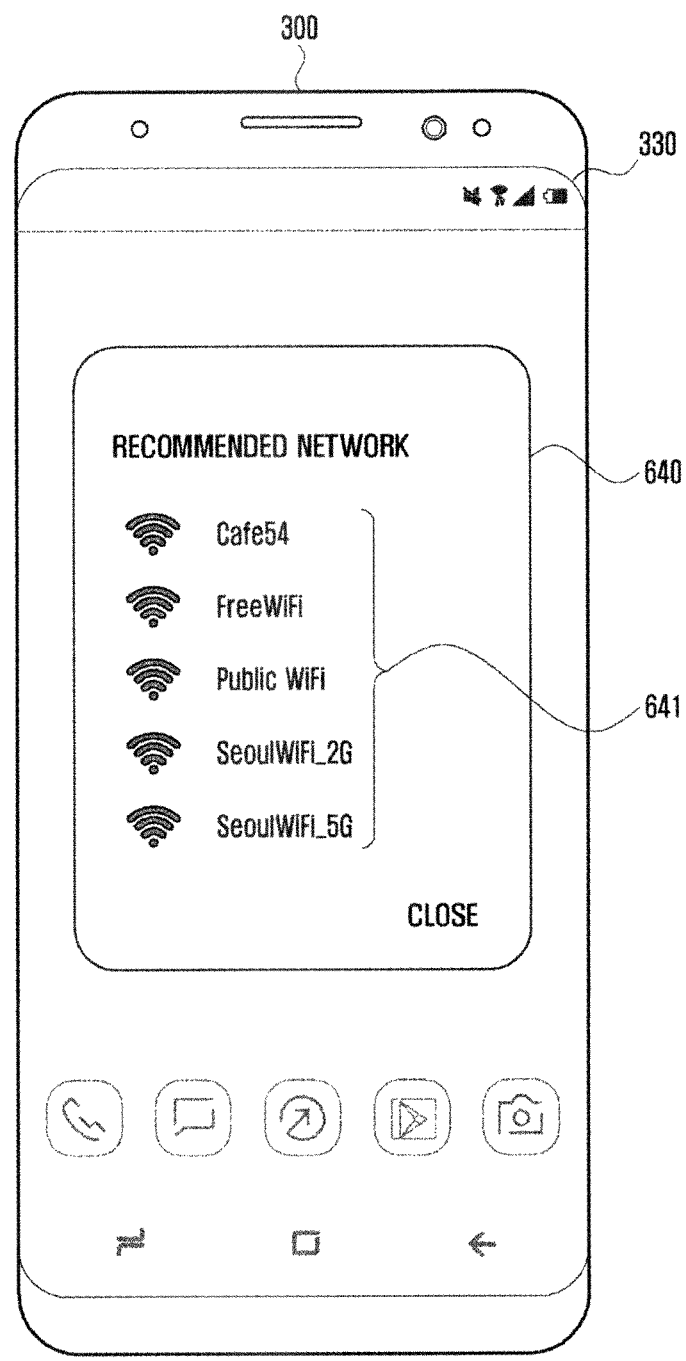
FIG. 6D illustrates various modes of displaying an AP list in an electronic device according to certain embodiments of the disclosure.

FIG. 6A illustrates various modes of displaying an AP list or a recommended AP in an electronic device according to certain embodiments of the disclosure. FIG. 6B illustrates various modes of displaying an AP list or a recommended AP in an electronic device according to certain embodiments of the disclosure. FIG. 6C illustrates various modes of displaying an AP list or a recommended AP in an electronic device according to certain embodiments of the disclosure. FIG. 6D illustrates various modes of displaying an AP list or a recommended AP in an electronic device according to certain embodiments of the disclosure.

A processor (e.g., the processor 320 of FIG. 3) of an electronic device (e.g., the electronic device 300 of FIG. 3) according to certain embodiments of the disclosure may display an AP list changed on the basis of state information about the electronic device 300 in various forms. FIG. 6A to FIG. 6D show various modes of displaying the changed AP list.

Referring to FIG. 6A, the processor 320 may provide an access area 610 to activate or deactivate various functions (e.g., a short-range communication network activation function, a BLUETOOTH™ activation function, a sound output mode selection function, a screen switch function according to the position change of the electronic device 300, or an airplane mode switch function) that the electronic device 300 can provide on a display (e.g., the display 330 of FIG. 3).

According to certain embodiments of the disclosure, the processor 320 may display an AP list 613 in response to user input to select an icon 611 for turning on or off the short-range communication network activation function on the access area 610. According to an embodiment, the processor 320 may display the AP list 613 in response to user input to execute an option to configure a short-range communication network.

According to certain embodiments of the disclosure, the processor 320 may display the AP list 613 changed according to an arrangement criterion determined on the basis of the state information about the electronic device 300.

According to certain embodiments of the disclosure, the AP list 613 may display information about some APs 615 among APs included in the AP list changed according to the determined arrangement criterion. Some APs may include APs disposed at the top of the AP list changed according to the arrangement criterion determined on the basis of the state information.

According to certain embodiments of the disclosure, the processor 320 may display information about all APs included in the AP list in response to user input to select a button 617 for displaying undisplayed APs.

Referring to FIG. 6B, the processor 320 may display information 623 about a recommended AP in an information display area 621 communicative proximity to the state information 620 about the electronic device 300 (e.g., the remaining battery capacity, the receiver sensitivity of a cellular network connected to the electronic device 300, or time) displayed at the top of the display 330. The processor 320 may determine an AP having the highest priority among the APs included in the AP list as the recommended AP and may display information including at least part of the information 623 about the recommended AP in the information display area 621. The processor 320 may control the communication module 310 to perform a series of operations to connect with the selected AP in response to user input 625 to establish a connection to the displayed AP.

Referring to FIG. 6C, the processor 320 may display the information including information 631 about an AP, recommended on the basis of the state information about the electronic device 300, in a pop-up form 630.

According to certain embodiments of the disclosure, the processor 320 may display the pop-up form 630 including the information 631 about the AP having the highest priority among the APs included in the AP list. The processor 320 may control the communication module 310 to perform a series of operations to connect with the selected AP in response to user input 633 to establish a connection to the displayed AP.

Referring to FIG. 6D, the processor 320 may display, in a pop-up form, an AP list 640 changed according to an arrangement criterion determined on the basis of the state information about the electronic device 300.

According to certain embodiments of the disclosure, the processor 320 may display information 641 about one or more APs included in the changed AP list 640 in a pop-up form. The processor 320 may control the communication module 310 to perform a series of operations to connect with a selected AP in response to user input to select one AP from the one or more APs.

Figure 7A:
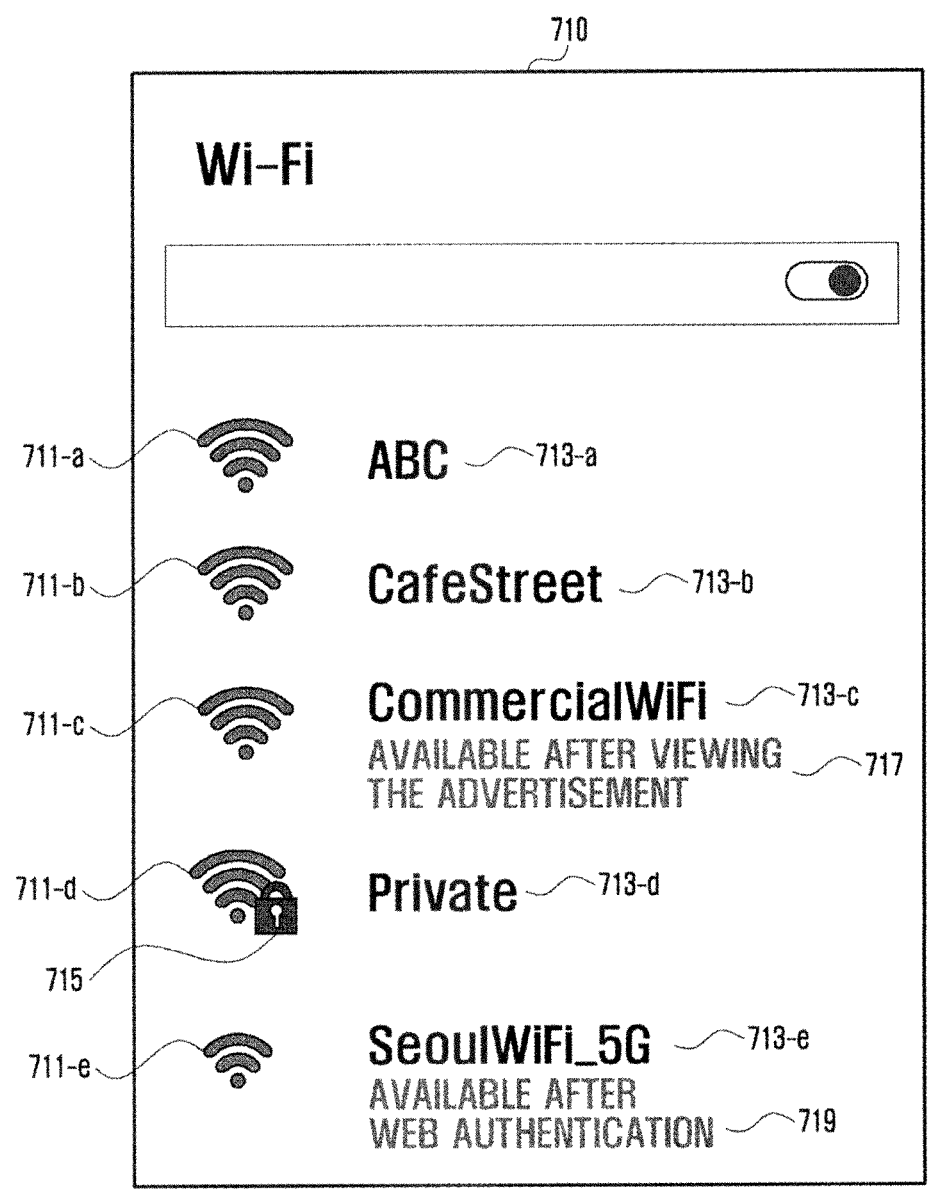
FIG. 7A illustrates an example in which an electronic device displays an AP list generated on the basis of AP information received from an external server according to certain embodiments of the disclosure.
Figure 7B:
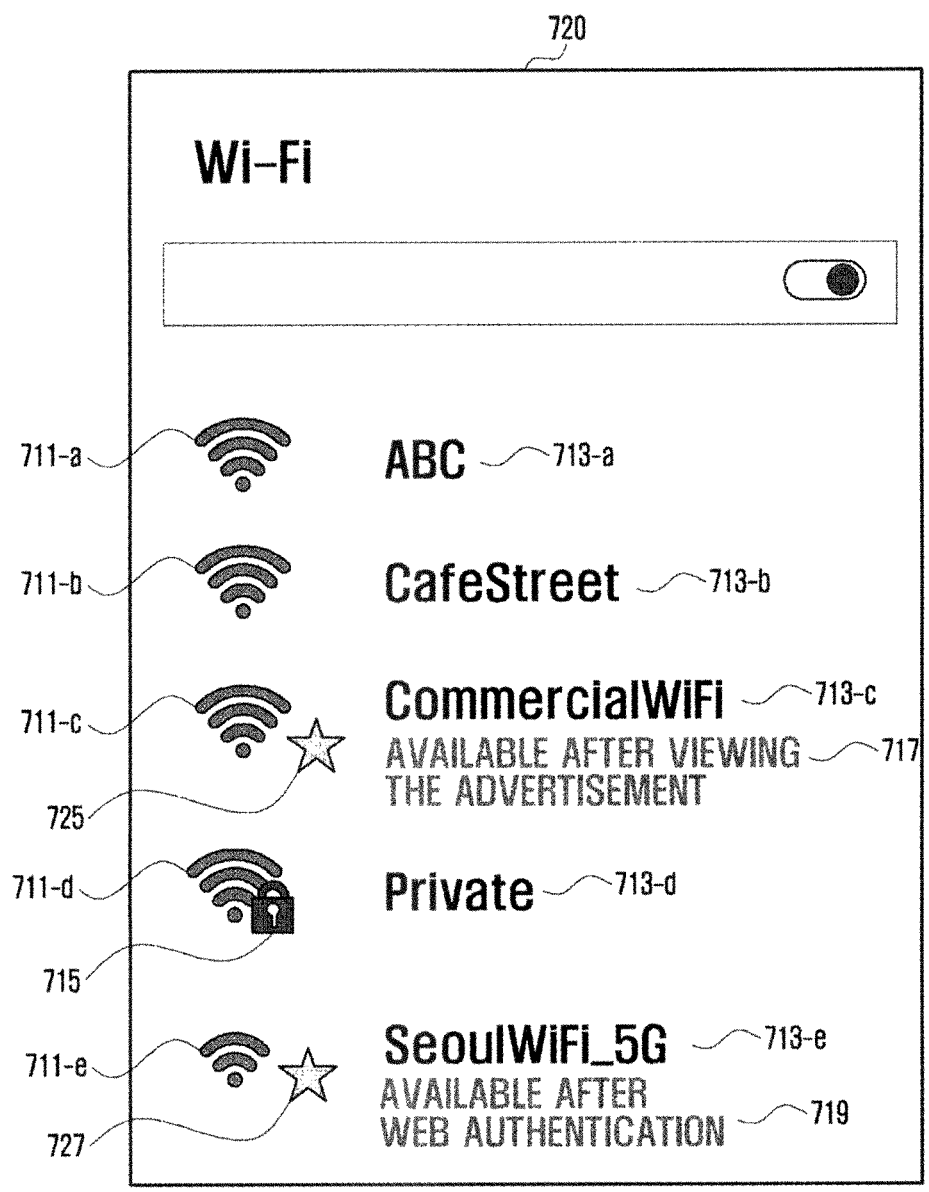
FIG. 7B illustrates an example in which an electronic device displays an AP list generated on the basis of AP information received from an external server according to certain embodiments of the disclosure.

FIG. 7A illustrates an example in which an electronic device displays an AP list generated on the basis of AP information received from an external server according to certain embodiments of the disclosure. FIG. 7B illustrates an example in which an electronic device displays an AP list generated on the basis of AP information received from an external server according to certain embodiments of the disclosure.

According to certain embodiments of the disclosure, an electronic device (e.g., the electronic device 300 of FIG. 3) may transmit AP information collected by the electronic device 300 to an external server (e.g., the server 108 of FIG. 1). The external server may manage at least one piece of AP information. The external server 108 may collect information about an AP from a plurality of electronic devices having accessed the AP. The external server 108 may generate and manage AP information using the collected information. The external server 108 may transmit, to the electronic device 300, additional AP information corresponding to an AP identifier (e.g., the SSID of an AP or the MAC address of an AP) included in the AP information transmitted by the electronic device 300. The additional information stored by the external server 108 may include at least one of network quality information about an AP, location information about an AP, or information indicating whether to set encryption of an AP.

According to certain embodiments of the disclosure, a processor (e.g., the processor 320 of FIG. 3) of the electronic device 300 may provide the additional AP information received from the external server along with an AP list.

Referring to FIG. 7A, the processor 320 may display an AP list 710 on the display 330. The AP list 710 may include one or more pieces of AP information. The AP information may include the RSSI 711-*a*, 711-*b*, 711-*c*, 711-*d*, or 711-*e* of each AP, the identifier 713-*a*, 713-*b*, 713-*c*, 713-*d*, or 713-*e* of each AP (the name, SSID, or MAC address of each AP), or information 715 indicating whether user authentication is required. According to certain embodiments of the disclosure, the processor 320 may display the additional AP information received from the external server 108 along with the AP information included in the AP list 710. For example, the processor 320 may display information 717 indicating that a network provided by an AP is available after viewing the advertisement, which is additional information associated with the AP having an identifier of CommercialWiFi 713-*c* from the external server 108, near to AP information associated with the additional information. In another example, the processor 320 may display information 719 indicating that a network provided by an AP is available after web authentication, which is additional information associated with the AP having an identifier of SeoulWiFi_5G 713-*e* from the external server 108, near to AP information associated with the additional information.

Referring to FIG. 7B, the processor 320 may display an AP list 720 on the display 330. The processor 320 may display the additional information (e.g., the information 717 indicating that a network provided by an AP is available after viewing the advertisement or the information 719 indicating that a network provided by an AP is available after web authentication) received from the external server (not shown) on the AP list 720.

According to certain embodiments of the disclosure, the processor 320 may also display an indicator indicating that the additional information has been received from the external server (e.g., the server 108 of FIG. 1). Referring to FIG. 7B, the processor 320 may display indicators 725 and 727 indicating that the additional information has been received via the external server 108.

According to certain embodiments of the disclosure, the processor 320 may display the additional information received from the external server 108 on the AP list 710 or 720, thereby assisting the user in selecting an AP to use.

Figure 7C:
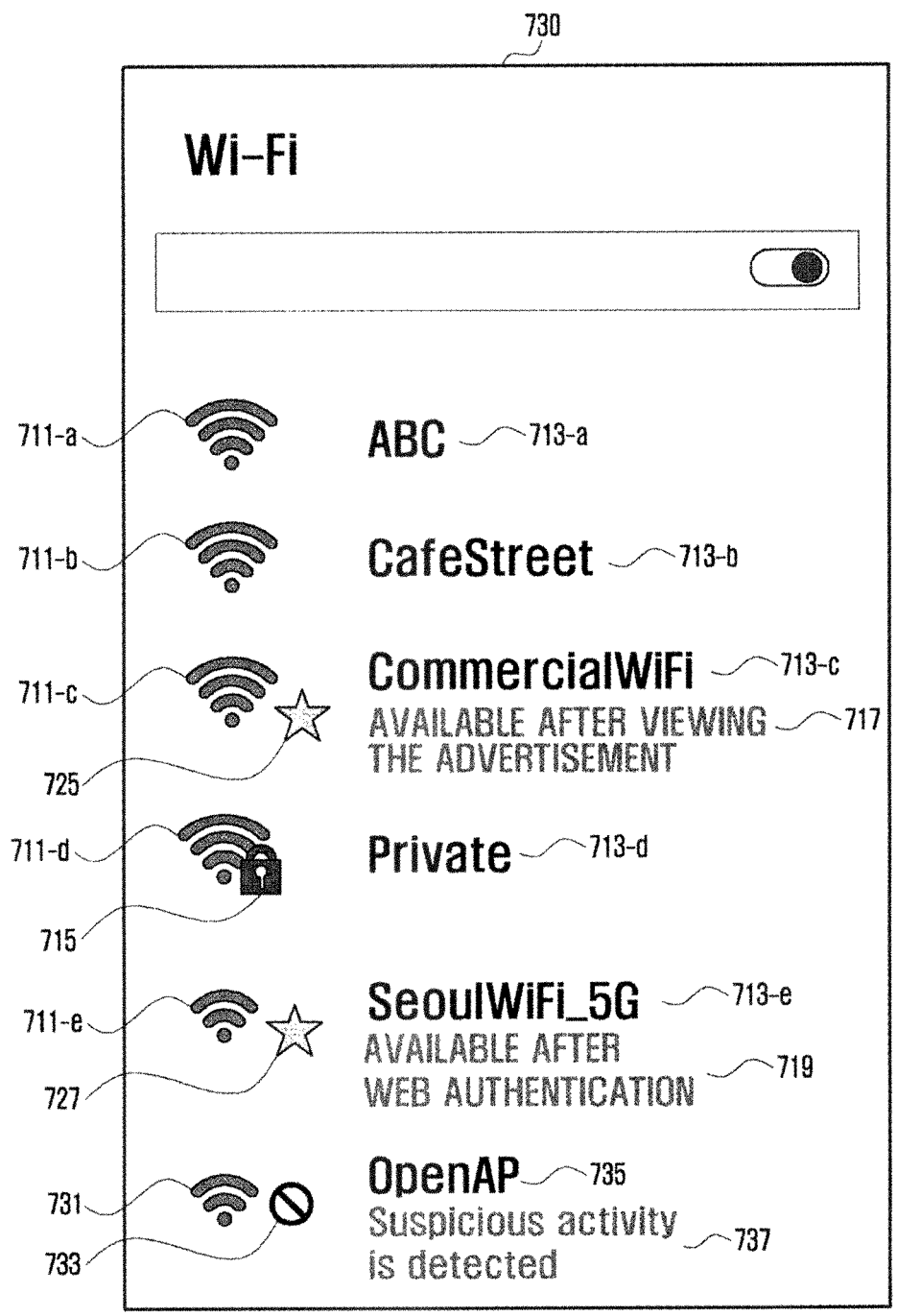
FIG. 7C illustrates an example in which an electronic device displays an AP list displays an AP list generated on the basis of AP information received from an external server, further including information regarding an open access point.

Referring to FIG. 7C, FIG. 7C illustrates an example in which an electronic device displays an AP list displays an AP list generated on the basis of AP information received from an external server, further including information regarding an open access point. As seen therein, an "OpenAP" 735 is displayed with a textual warning 737 that "suspicious activity is detected." The warning can be supplemented by a warning image 733 prompting to a user that connection to OpenAP 735 is either discouraged or forbidden. As with the other access networks, a RSSI icon 731 may indicate a strength of signal of the OpenAP network.

Figure 8:
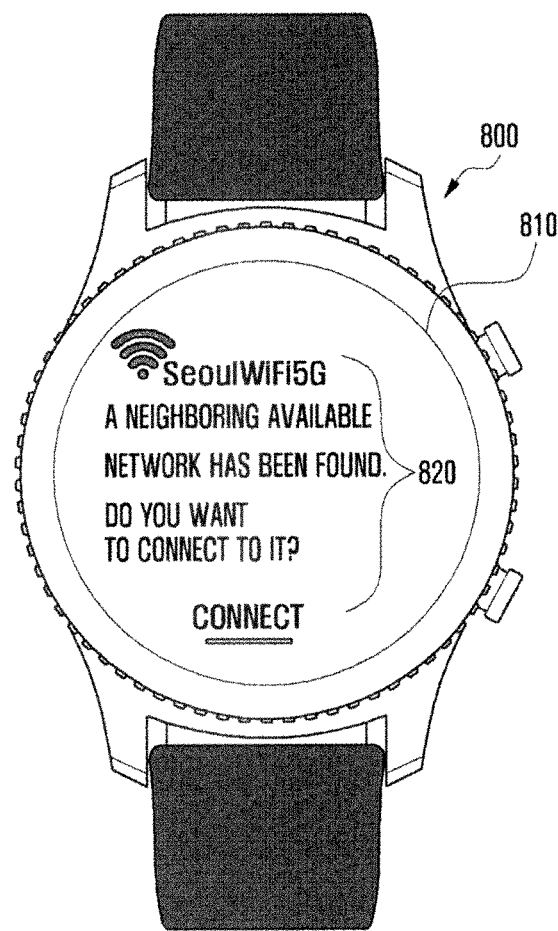
FIG. 8 illustrates an example in which an electronic device displays a generated AP list on an external electronic device connected with the electronic device according to certain embodiments of the disclosure.

FIG. 8 illustrates an example in which an electronic device displays an AP list on an external electronic device connected with the electronic device according to certain embodiments of the disclosure.

According to certain embodiments of the disclosure, an electronic device (e.g., the electronic device 300 of FIG. 3) may transmit an AP list changed on the basis of state information about the electronic device 300 or information about a recommended AP to an external electronic device 800 (e.g., a wearable device) connected with the electronic device 300.

According to certain embodiments of the disclosure, the external electronic device 800 may display the AP list or the information about the recommended AP, received from the electronic device 300, on a display 810. There is no limit to methods for displaying the received AP list or information about the recommended AP. For example, the external electronic device 800 may display a message 820 for identifying whether to connect with an AP having the highest priority among a plurality of APs included in the AP list. In another example, the external electronic device 800 may display information about the plurality of APs included in the AP list.

According to certain embodiments of the disclosure, the external electronic device 800 may display the message 820 for recommending an AP having the highest priority among the APs included in the AP list. The external electronic device 800 may transmit an indicator indicating a connection to an AP to the electronic device 300 in response to user input to establish a connection to the displayed AP. The electronic device 300 may control the communication module 310 to perform a series of operations to connect with the selected AP.

According to certain embodiments of the disclosure, the external electronic device 800 may transmit the AP list or the information about the recommended AP to a different external electronic device (not shown).

According to certain embodiments of the disclosure, the external electronic device 800 may receive the AP list or the information about the recommended AP from the electronic device 800 using various networks (e.g., a WI-FI™ network or a BLUETOOTH™ network) supporting a peer-to-peer (P2P) method. The external electronic device 800 may perform network discovery, may establish a connection with the discovered electronic device 300 as a result of network discovery, and may receive the AP list from the electronic device 300. The external electronic device 800 may transmit the received AP list or information about the recommended AP to a different external electronic device.

According to certain embodiments of the disclosure, the external electronic device 800 may retrieve the electronic device 300 that shares network information using a neighbor awareness network (NAN) discovery procedure and may receive the AP list of the information about the recommended AP from the retrieved electronic device 300. The external electronic device 800 may transmit the AP list or the information about the recommended AP to a different external electronic device (not shown) using a WI-FI™ direct or BLUETOOTH™ method. The different external electronic device may receive the AP list or the information about the recommended AP, and may request further information from the external electronic device 800 or an external server (not shown) if there is more information utilized to establish a connection with an AP.

An electronic device (e.g., the electronic device 300 of FIG. 3) according to certain embodiments of the disclosure may include: at least one communication module (e.g., the communication module 310 of FIG. 3); a display (e.g., the display 330 of FIG. 3); a memory (e.g., the memory 340 of FIG. 3); and a processor (e.g., the processor 320 of FIG. 3) configured to be operatively connected to the communication module 310, the display 330, and the memory 340, such that the processor 320 may receive access point (AP) information from at least one AP through the communication module, may generate an AP list including an AP connectable with the electronic device 300 on the basis of the received AP information, may store the AP list in the memory 340, may identify a state of the electronic device, may determine an arrangement criterion for the AP list on the basis of state information about the electronic device, and may control the display 330 to display the AP list according to the determined arrangement criterion.

In the electronic device 300 according to certain embodiments of the disclosure, the processor 320 may be configured to determine a priority of a plurality of arrangement criteria on the basis of the state information about the electronic device 300 and to change the AP list on the basis of the determined priority.

In the electronic device 300 according to certain embodiments of the disclosure, the processor 320 may be configured to detect a change in the state information, to change the arrangement criterion for the AP list upon detecting the change in the state information, and to change the AP list on the basis of the changed arrangement criterion.

In the electronic device 300 according to certain embodiments of the disclosure, the processor 320 may be configured to receive the AP information from an external electronic device that stores the AP information.

In the electronic device 300 according to certain embodiments of the disclosure, the processor 320 may be configured to transmit the changed AP list to an external electronic device (e.g., the external electronic device 800 of FIG. 8) so that the changed AP list is displayed on the external electronic device 800 connected with the electronic device 300.

In the electronic device 300 according to certain embodiments of the disclosure, the state information may include connection history information of the electronic device 300 about the at least one AP, and the processor 320 may be configured to determine the arrangement criterion for the AP list on the basis of the connection history information about the AP.

In the electronic device 300 according to certain embodiments of the disclosure, the state information may include a tariff plan of a network used by the electronic device 300, and the processor 320 may be configured to determine the arrangement criterion for the AP list on the basis of the tariff plan.

In the electronic device 300 according to certain embodiments of the disclosure, the state information may include information indicating whether the electronic device 300 is put on roaming, and the processor 320 may be configured to determine the arrangement criterion for the AP list on the basis of the information indicating whether the electronic device is put on roaming.

In the electronic device 300 according to certain embodiments of the disclosure, the processor 320 may be configured to identify state information about a first network connected with the electronic device 300, to change a priority of at least one AP capable of using another network on the basis of the state information about the first network, and to display the AP list changed according to the changed priority.

An electronic device 300 according to certain embodiments of the disclosure may include: at least one communication module 310; a display 330; a memory 340; and a processor 320 configured to be operatively connected to the communication module 310, the display 330, and the memory 340, such that the processor 320 may receive AP information about at least one AP connectable with the electronic device 300 through the communication module, may display an AP list based on the received AP information, may detect a change in a state of the electronic device 300, may determine an arrangement criterion for the AP list upon detecting the change in the state of the electronic device 300, and may control the display 330 to display the AP list according to the determined arrangement criterion.

In the electronic device 300 according to certain embodiments of the disclosure, the processor 320 may be configured to receive the AP information from an external electronic device that stores the AP information, to generate the AP list on the basis of the AP information, and to store the AP list in the memory.

In the electronic device 300 according to certain embodiments of the disclosure, the state information may include a tariff plan of a network used by the electronic device 300, and the processor 320 may be configured to determine the arrangement criterion for the AP list on the basis of the tariff plan.

In the electronic device 300 according to certain embodiments of the disclosure, the state information may include information indicating whether the electronic device is put on roaming, and the processor 320 may configured to determine the arrangement criterion for the AP list on the basis of the information indicating whether the electronic device is put on roaming.

In the electronic device 300 according to certain embodiments of the disclosure, the processor 320 may be configured to identify state information about a first network connected with the electronic device, to change a priority of at least one AP capable of using another network on the basis of the state information about the first network, and to display the AP list changed according to the changed priority.

Figure 9:
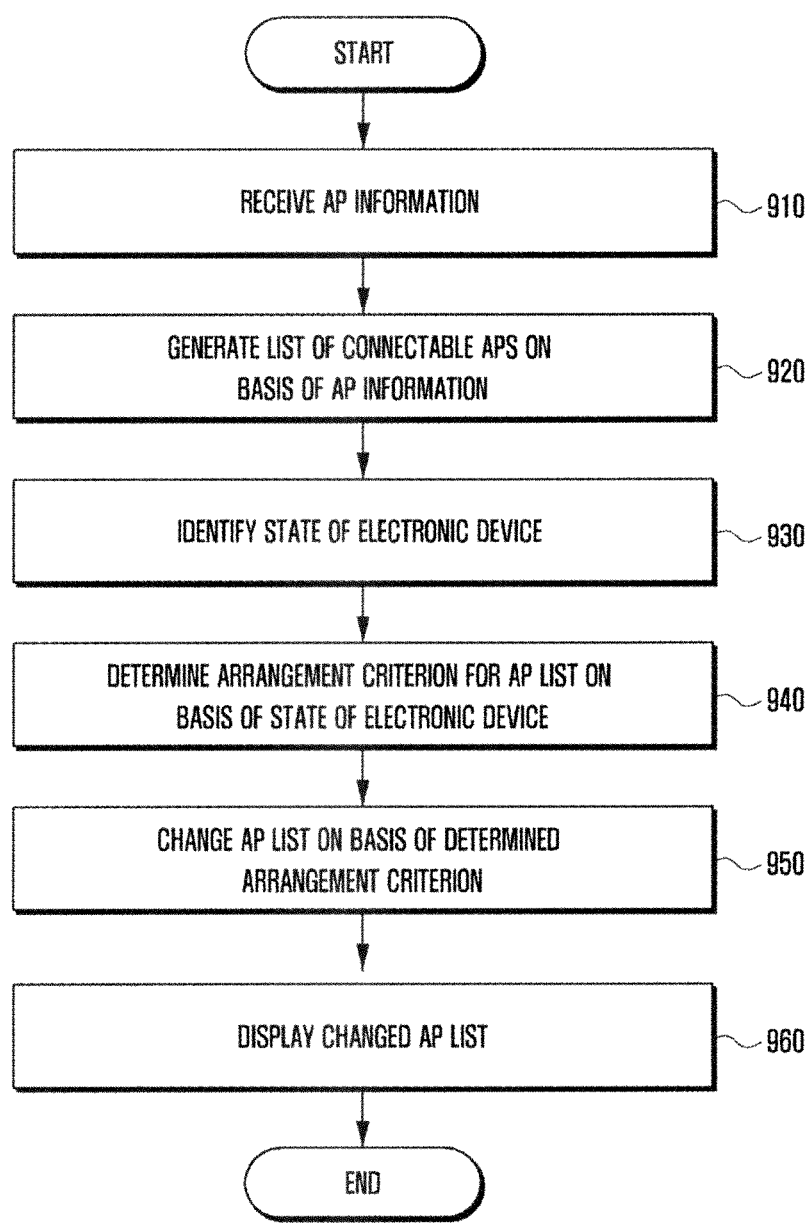
FIG. 9 is a flowchart illustrating an operating method of an electronic device according to certain embodiments of the disclosure.

FIG. 9 is a flowchart illustrating an operating method of an electronic device according to certain embodiments of the disclosure.

Referring to FIG. 9, an operating method of an electronic device (e.g., the electronic device 300 of FIG. 3) according to certain embodiments of the disclosure may receive AP information in operation 910.

According to certain embodiments of the disclosure, the AP information may include various pieces of information about an AP, such as the SSID, BSSID, MAC address, a frequency band, channel bandwidth information, or location information of the AP. For example, the AP information may be included in a beacon frame broadcast by the AP. The beacon frame may be broadcasted by the AP every preset period, and the AP may transmit the beacon frame to the electronic device 300 in response to a request from the electronic device 300.

According to certain embodiments of the disclosure, the AP information may include additional information that is transmitted by an external server (e.g., the server 108 of FIG. 1) connected with the electronic device 300. The additional information transmitted by the external server 108 may include at least one of network quality information about the AP, location information about the AP, or information indicating whether to set encryption of the AP.

According to certain embodiments of the disclosure, in operation 920, the electronic device 300 may generate an AP list including one or more communicatively connectable APs on the basis of the received AP information.

According to certain embodiments of the disclosure, in operation 930, the electronic device 300 may identify the state of the electronic device 300.

According to certain embodiments of the disclosure, state information about the electronic device 300 may include location information about the electronic device 300, a tariff plan of a cellular network used by the electronic device 300 or state information about the cellular network used by the electronic device 300 (information about whether the electronic device 300 is put on roaming). However, the aforementioned examples are provided for illustrative purposes, and the state information about the electronic device 300 may include various pieces of information.

According to certain embodiments of the disclosure, in operation 940, the electronic device 300 may determine a criterion for arranging the AP list on the basis of the state information about the electronic device 300. That is, a display order of APs included in the AP list may be changed or reordered according to the determined criterion.

According to certain embodiments of the disclosure, the electronic device 300 may store various criteria for arranging the AP list in the memory 340 and may select at least one arrangement criterion from among the various criteria on the basis of the state information about the electronic device 300.

According to certain embodiments of the disclosure, the criterion for arranging the AP list may include various criteria including a criterion for listing AP names in alphabetical order, a criterion for listing APs in signal strength (RSSI) order, a criterion for first listing APs available to all users without entering a password, a criterion for first listing captive portal networks available after authentication, or a criterion for first listing APs available for free.

According to certain embodiments of the disclosure, when identifying that there is an AP corresponding to the AP information stored in the memory 340, the electronic device 300 may select an arrangement criterion for listing the identified AP first. The AP list may include an AP having a history of connection with the electronic device 300. The AP information stored in the memory 340 may include information about the AP having the history of connection with the electronic device 300. The processor 320 may change the AP list such that the identified AP is listed first. When identifying that there is no AP corresponding to the AP information stored in the memory 340, the processor 320 may select an arrangement criterion for listing an AP corresponding to an open network, which is a network connectable without entering a password or performing an authentication process, listing APs in signal strength order, or listing AP names in alphabetical order. The processor 320 may change the AP list such that the open network is listed first.

According to certain embodiments of the disclosure, in operation 950, the electronic device 300 may change the AP list (e.g., changing a display order of APs included in the AP list) according to the determined arrangement criterion. According to certain embodiments of the disclosure, the processor 320 may change the AP list using the selected arrangement criterion. The processor 320 may arrange at least one AP included in the AP list according to the selected arrangement criterion (or a plurality of APs included in the AP list, sorting them into a different arrangement).

According to certain embodiments of the disclosure, in operation 960, the electronic device 300 may display the changed AP list on a display (e.g., the display 330 of FIG. 3).

Figure 10:
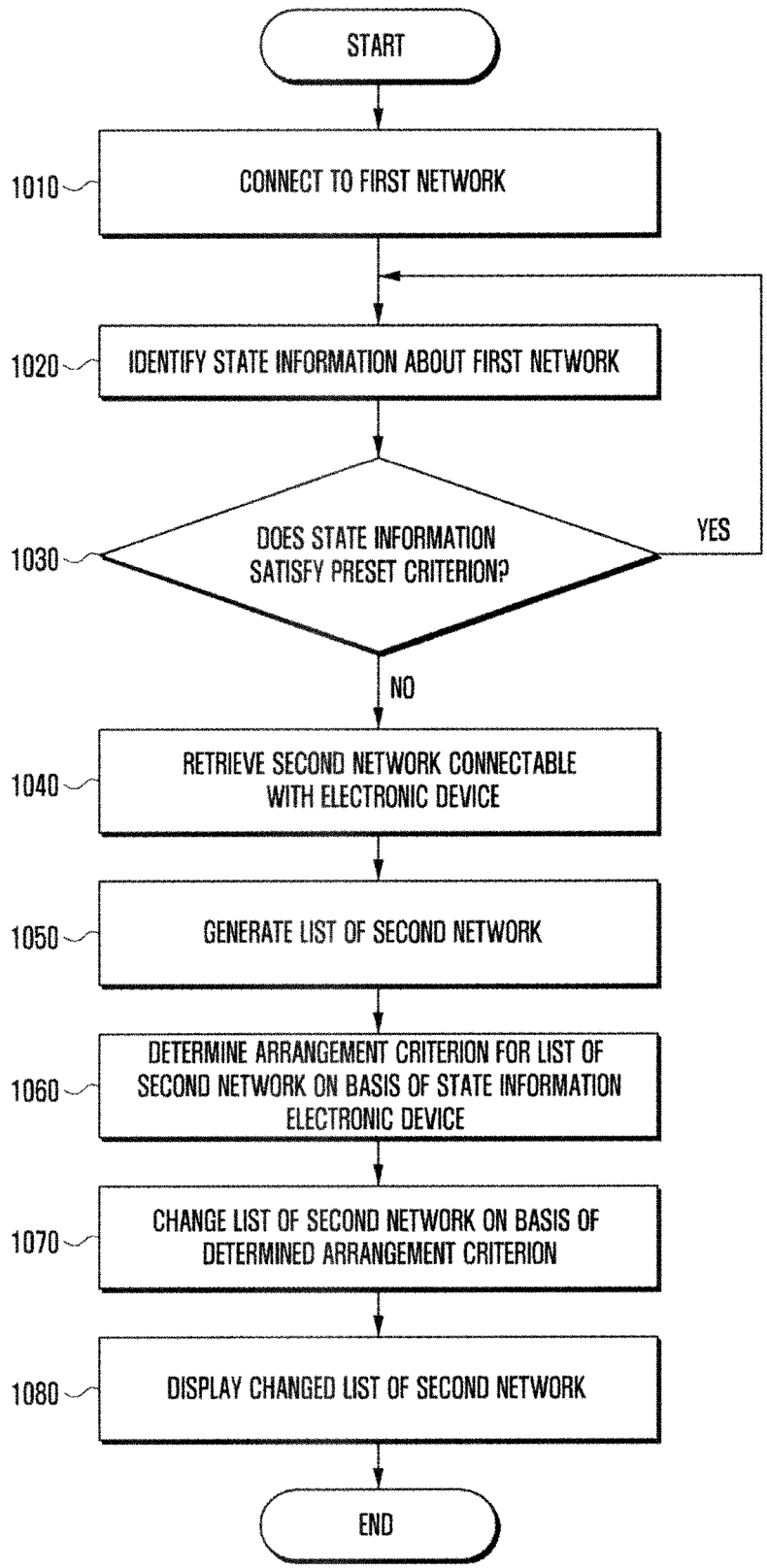
FIG. 10 illustrates an example of displaying a network list for connecting to a different network in an operating method of an electronic device according to certain embodiments of the disclosure.

FIG. 10 illustrates an example of displaying a network list for connecting a different network in an operating method of an electronic device according to certain embodiments of the disclosure.

Referring to FIG. 10, in operation 1010 of an operating method of an electronic device (e.g., the electronic device 300 of FIG. 3) according to certain embodiments of the disclosure, the electronic device 300 may connect to a first network.

According to certain embodiments of the disclosure, the first network may include various networks, such as a cellular network, a short-range communication network, and the like. The electronic device 300 may transmit and receive data through a connection with the first network. The electronic device 300 may establish a connection to the first network via user input to communicatively connect to the first network or without user input.

According to certain embodiments of the disclosure, the electronic device 300 may connect to the first network when a particular application is executed. For example, the electronic device 300 may connect to the first network when a video streaming program is executed.

According to certain embodiments of the disclosure, in operation 1020, the electronic device 300 may identify state information about the first network.

According to certain embodiments of the disclosure, the state information about the first network may include information about cost that a user needs to pay to use the first network, the connection state of the first network, or quality information about the first network. The electronic device 300 may identify the state information about the first network on the basis of subscription information stored in the subscriber identification module 196 of the electronic device 300, information about an operator of the first network, or various pieces of information received from a server operated by the operator of the first network.

According to certain embodiments of the disclosure, in operation 1030, the electronic device 300 may determine whether the state information about the first network satisfies a preset criterion.

According to certain embodiments of the disclosure, the electronic device 300 may determine whether the information about the cost that the user needs to pay included in the state information about the first network is less than a preset amount of money.

According to certain embodiments of the disclosure, the electronic device 300 may determine whether the quality information about the first network included in the state information about the first network satisfies a preset quality.

According to certain embodiments of the disclosure, the first network may have security settings, such as a restriction on a connection using a particular site or a particular port, depending on settings by the operator of the first network. For example, settings to restrict a connection to a port used for various applications (e.g., a message transmission application) may be applied to an AP in a company's workplace in order to enhance network security. The electronic device 300 may identify whether it is possible to use a particular application using the first network included in the state information about the first network.

According to certain embodiments of the disclosure, the electronic device 300 may detect execution of the particular application or may periodically identify whether it is possible to use the particular application using the first network.

According to certain embodiments of the disclosure, in operation 1040, when determining that the state information about the first network does not satisfy the preset criterion, the electronic device 300 may retrieve a second network communicatively connectable with the electronic device 300.

According to certain embodiments of the disclosure, the electronic device 300 may determine that the state information about the first network does not satisfy the preset criterion and may retrieve the second network switchable from the first network.

According to certain embodiments of the disclosure, the second network may be a short-range communication network provided by an AP located within a preset distance from the electronic device 300. For example, the second network may include various short-range communication networks, such as a WI-FI™ network or a ZIGBEE™ network.

According to certain embodiments of the disclosure, the electronic device 300 may determine that the cost that the user needs to pay included in the state information about the first network is not less than the preset amount of money and may retrieve the second network switchable from the first network.

According to certain embodiments of the disclosure, the electronic device 300 may determine that the quality information about the first network included in the state information about the first network does not satisfy the preset quality and may retrieve the second network switchable from the first network.

According to certain embodiments of the disclosure, when determining that it is impossible to use the particular application using the first network included in the state information about the first network, the electronic device 300 may retrieve the second network switchable from the first network.

According to certain embodiments of the disclosure, in operation 1050, the electronic device 300 may generate a list of the second network.

According to certain embodiments of the disclosure, the list of the second network may refer to an AP list including APs to which the electronic device 300 is connectable. The list of the second network may be generated on the basis of AP information about each of the APs to which the electronic device 300 is connectable. The AP information may include various pieces of information about an AP including the SSID, BSSID, MAC address, frequency band, channel bandwidth information, or location information of the AP. The AP information may be included in a beacon signal broadcast by an AP connectable with the electronic device 300.

According to certain embodiments of the disclosure, the electronic device 300 may retrieve the second network connectable with the electronic device 300 and may request information about the retrieved second network from an external server 108. The electronic device 300 may generate the list of the second network using the information about the second network transmitted by the external server 108.

According to certain embodiments of the disclosure, in operation 1060, the electronic device 300 may determine a criterion for arranging the list of the second network on the basis of state information about the electronic device 300.

According to certain embodiments of the disclosure, the electronic device 300 may store various arrangement criteria for the list of the second network in the memory 340 and may select at least one of the various arrangement criteria on the basis of the state of the electronic device 300.

According to certain embodiments of the disclosure, the arrangement criteria for the list of the second network may include various criteria, such as a criterion for listing AP names in alphabetical order, a criterion for listing APs in signal strength (RSSI) order, a criterion for first listing APs available to all users without entering a password, a criterion for first listing captive portal networks available after authentication, or a criterion for first listing APs available for free.

According to certain embodiments of the disclosure, when identifying that there is an AP corresponding to the AP information stored in the memory 340, the electronic device 300 may select an arrangement criterion for listing the identified AP first. The processor 320 may change the list of the second network such that the identified AP is listed first. When identifying that there is no AP corresponding to the AP information stored in the memory 340, the processor 320 may select an arrangement criterion for listing an AP corresponding to an open network, which is a network connectable without entering a password or performing an authentication process, listing APs in signal strength order, or listing AP names in alphabetical order. For example, the processor 320 may change the list of the second network such that the open network is listed first.

According to certain embodiments of the disclosure, in operation 1070, the electronic device 300 may change the list of the second network on the basis of the determined arrangement criterion (e.g., changing an arrangement of elements included in the list of the second network).

According to certain embodiments of the disclosure, the processor 320 may change the list of the second network using the selected arrangement criterion. The processor 320 may arrange at least one AP included in the list of the second network according to the selected arrangement criterion.

According to certain embodiments of the disclosure, in operation 1080, the electronic device 300 may display the changed list of the second network on a display (e.g., the display 330 of FIG. 3).

According to certain embodiments of the disclosure, the electronic device 300 may retrieve the second network before establishing a communicative connection to the first network, in which case operation 1040 may be omitted.

Figure 11:
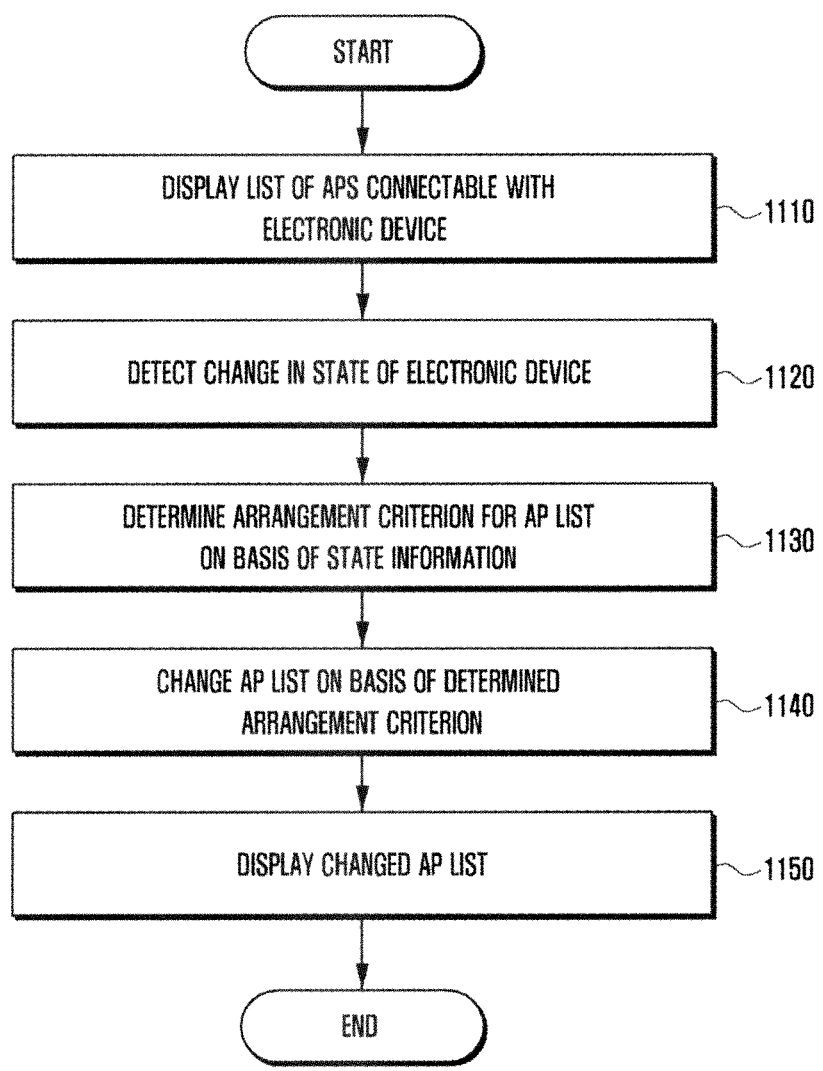
FIG. 11 illustrates an example in which an AP list is changed depending on a change in the state of an electronic device in an operating method of an electronic device according to certain embodiments of the disclosure.

FIG. 11 illustrates an example in which an AP list is changed depending on a change in the state of an electronic device in an operating method of an electronic device according to certain embodiments of the disclosure.

Referring to FIG. 11, in operation 1110 of an operating method of an electronic device (e.g., the electronic device 300 of FIG. 3) according to certain embodiments of the disclosure, the electronic device 300 may display an AP list including at least one AP communicatively connectable with the electronic device 300.

According to certain embodiments of the disclosure, the AP list displayed in operation 1110 may be an AP list which is completely arranged on the basis of at least one arrangement criterion among various arrangement criteria stored in a memory (e.g., the memory 340 of FIG. 3) of the electronic device 300.

According to certain embodiments of the disclosure, in operation 1120, the electronic device 300 may detect a change in the state of the electronic device 300.

According to certain embodiments of the disclosure, state information about the electronic device 300 may include location information about the electronic device 300, a tariff plan of a cellular network used by the electronic device 300, state information about the cellular network used by the electronic device 300 (e.g., whether the electronic device 300 is put on roaming), information about an application being used in the electronic device 300, or motion information about the electronic device 300. However, the aforementioned examples are provided for illustrative purposes, and the state information about the electronic device 300 may include various pieces of information.

For example, the electronic device 300 may detect a switch to a roaming state in which the operator of a cellular network used by the electronic device 300 is changed. In another example, the electronic device 300 may detect a switch to a state in which the remaining amount of transmittable and receivable data provided by the operator of the cellular network is reduced to a preset value or less. In still another example, the electronic device 300 may detect that the electronic device 300 moves from an existing location to a different location.

According to certain embodiments of the disclosure, in operation 1130, the electronic device 300 may determine an arrangement criterion for the AP list on the basis of the changed state information about the electronic device 300.

According to certain embodiments of the disclosure, the electronic device 300 may store various arrangement criteria for the AP list in the memory 340 and may select at least one arrangement criterion from among the various arrangement criteria on the basis of the changed state information about the electronic device 300.

According to certain embodiments of the disclosure, the arrangement criteria of the AP list may include various criteria, such as a criterion for listing AP names in alphabetical order, a criterion for listing APs in signal strength (RSSI) order, a criterion for first listing APs available to all users without entering a password, a criterion for first listing captive portal networks available after authentication, or a criterion for first listing APs available for free. There may be a plurality of arrangement criteria for the AP list, each of which may have a weight. The electronic device 300 may change the AP list using a weight that is set for each of the plurality of arrangement criteria or by applying a different weight on the basis of the state of the electronic device.

According to certain embodiments of the disclosure, when identifying that there is an AP corresponding to the AP information stored in the memory 340, the electronic device 300 may select an arrangement criterion for listing the identified AP first. The processor 320 may change the AP list such that the identified AP is listed first. When identifying that there is no AP corresponding to the AP information stored in the memory 340, the processor 320 may select an arrangement criterion for listing an AP corresponding to an open network, which is a network connectable without entering a password or performing an authentication process, listing APs in signal strength order, or listing AP names in alphabetical order. The processor 320 may change the AP list such that the open network is listed first.

According to certain embodiments of the disclosure, in operation 1140, the electronic device 300 may change the AP list on the basis of the determined arrangement criterion (e.g., changing a display order or arrangement of APs listed within the AP list based on the arrangement criterion).

According to certain embodiments of the disclosure, the processor 320 may change the AP list using the selected arrangement criterion. The processor 320 may arrange at least one AP included in the AP list according to the selected arrangement criterion and/or multiple arrangement criterions, if selected for use.

According to certain embodiments of the disclosure, in operation 1150, the electronic device 300 may display the changed AP list on a display (e.g., the display 330 of FIG. 3).

An operating method of an electronic device (e.g., the electronic device 300 of FIG. 3) according to certain embodiments of the disclosure may include: receiving access point (AP) information about at least one AP connectable with the electronic device 300 through a wireless communication module (e.g., the communication module 310 of FIG. 3); generating an AP list including the AP connectable with the electronic device 300 on the basis of the received AP information and storing the AP list in a memory (e.g., the memory 340 of FIG. 3); identifying state information about the electronic device 300; determining an arrangement criterion for the AP list on the basis of the identified state information; changing the AP list on the basis of the determined arrangement criterion; and displaying the changed AP list on a display (e.g., the display 330 of FIG. 3).

The operating method of the electronic device 300 according to certain embodiments of the disclosure may further include: detecting a change in the state information; changing the arrangement criterion for the AP list upon detecting the change in the state information; and changing the AP list on the basis of the changed arrangement criterion.

The operating method of the electronic device 300 according to certain embodiments of the disclosure may further include: determining a priority of a plurality of arrangement criteria on the basis of the state information about the electronic device 300; and changing the AP list on the basis of the determined priority.

In the operating method of the electronic device 300 according to certain embodiments of the disclosure, the state information may include a tariff plan of a network used by the electronic device 300, and the determining of the arrangement criterion for the AP list includes determining the arrangement criterion for the AP list on the basis of the tariff plan.

In the operating method of the electronic device 300 according to certain embodiments of the disclosure, the state information may include information indicating whether the electronic device 300 is put on roaming, and the determining of the arrangement criterion for the AP list includes determining the arrangement criterion for the AP list on the basis of the information indicating whether the electronic device is put on roaming.

The operating method of the electronic device 300 according to certain embodiments of the disclosure may further include: identifying state information about a first network connected with the electronic device 300; changing a priority of at least one AP (and/or respective priorities for each of multiple APs) capable of using another network on the basis of the state information about the first network; and displaying the AP list changed according to the changed priority.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A portable communication device, comprising:
   a display;
   a memory;
   a wireless communication circuit configured to perform short range wireless communication;
   a processor operatively connected to the display, the memory and the wireless communication circuit, the processor configured to:
   receive access point (AP) information via the wireless communication circuit;
   generate an AP list including one or more APs communicatively connectable with the portable communication device based on the AP information;
   determine a display order of the one or more APs included in the AP list based on at least one of a plurality of arrangement criterions including a first arrangement criterion and a second arrangement criterion, the first arrangement criterion related to connection history between the portable communication device and a corresponding AP of the one or more APs, and the second arrangement criterion related to a security type of the corresponding AP indicating whether the corresponding AP is available without authentication; and
   display, via the display, the one or more APs based on the display order.

2. The portable communication device of claim 1, wherein the processor is configured to:
   perform the determining of the display order further based on a first priority for the first arrangement criterion and a second priority for the second arrangement criterion.

3. The portable communication device of claim 1, wherein the one or more APs includes a first AP available without authentication and a second AP available after authentication, and wherein the processor is configured to:
   perform the determining of the display order such that the first AP is to be located below the second AP in the display order.

4. The portable communication device of claim 1, wherein the processor is configured to:
   perform the receiving of the AP information using a first short range wireless communication protocol; and
   transmit another AP information corresponding to the one or more APs to another portable communication device other than the one or more APs using a second short range wireless communication protocol different from the first short range wireless communication protocol.

5. The portable communication device of claim 4, wherein the first short range wireless communication protocol includes a WiFi-based protocol, and the second short range wireless communication protocol includes a Bluetooth-based protocol.

6. The portable communication device of claim 1, wherein the processor is configured to:
receive, as at least part of the AP information, first AP information related to the corresponding AP from the corresponding AP using a first short range wireless communication protocol, and second AP information related to the corresponding AP from another portable communication device other than the corresponding AP using a second short range wireless communication protocol.

7. The portable communication device of claim 6, wherein the second short range wireless communication protocol includes a Bluetooth-based protocol.

8. The portable communication device of claim 1, wherein the processor is configured to:
display information associated with the security type indicating whether the corresponding AP is available without authentication, as a part of the AP list.

9. The portable communication device of claim 1, wherein the processor is configured to:
display information indicating that suspicious activity is detected in related with the corresponding AP, as a part of the AP list.

10. The portable communication device of claim 1, wherein the processor is configured to:
change the display order based at least in part on network state information corresponding to a network connected with the portable communication device via the corresponding AP.

11. The portable communication device of claim 1, wherein the processor is configured to:
transmit the AP list to another portable communication device other than the one or more APs such that the AP list is to be displayed via the other portable communication device.

12. The portable communication device of claim 11, wherein the processor is configured to:
select an AP from the one or more APs based at least in part on a user input received via the other portable communication device; and
establish a short range wireless communication connection between the portable communication device and the selected AP.

13. An operating method of a portable communication device, comprising:
receiving access point (AP) information via a wireless communication circuit;
generating an AP list including one or more APs communicatively connectable with the portable communication device based on the AP information;
determining a display order of the one or more APs included in the AP list based on at least one of a plurality of arrangement criterions including a first arrangement criterion and a second arrangement criterion, the first arrangement criterion related to connection history between the portable communication device and a corresponding AP of the one or more APs, and the second arrangement criterion related to a security type of the corresponding AP indicating whether the corresponding AP is available without authentication; and
displaying, via a display, the one or more APs based on the display order.

14. The operation method of claim 13, further comprising:
performing the determining of the display order further based on a first priority for the first arrangement criterion and a second priority for the second arrangement criterion.

15. The operation method of claim 13, wherein the one or more APs includes a first AP available without authentication and a second AP available after authentication, and wherein the method further comprises:
performing the determining of the display order such that the first AP is to be located below the second AP in the display order.

16. The operation method of claim 13, further comprising:
performing the receiving of the AP information using a first short range wireless communication protocol; and
transmitting another AP information corresponding to the one or more APs to another portable communication device other than the one or more APs using a second short range wireless communication protocol different from the first short range wireless communication protocol.

17. The operation method of claim 16, wherein the first short range wireless communication protocol includes a WiFi-based protocol, and the second short range wireless communication protocol includes a Bluetooth-based protocol.

18. The operation method of claim 13, further comprising:
receiving, as at least part of the AP information, first AP information related to the corresponding AP from the corresponding AP using a first short range wireless communication protocol, and second AP information related to the corresponding AP from another portable communication device other than the corresponding AP using a second short range wireless communication protocol.

19. The operation method of claim 18, wherein the second short range wireless communication protocol includes a Bluetooth-based protocol.

20. The operation method of claim 13, further comprising:
displaying information associated with the security type indicating whether the corresponding AP is available without authentication, as a part of the AP list.

* * * * *